(12) United States Patent
You et al.

(10) Patent No.: US 10,506,634 B2
(45) Date of Patent: Dec. 10, 2019

(54) METHOD AND TERMINAL FOR RECEIVING DATA THROUGH UNLICENSED BAND IN MOBILE COMMUNICATION SYSTEM

(71) Applicant: LG ELECTRONICS INC., Seoul (KR)

(72) Inventors: Hyangsun You, Seoul (KR); Yunjung Yi, Seoul (KR); Joonkui Ahn, Seoul (KR); Hanbyul Seo, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 15/324,251

(22) PCT Filed: Jul. 2, 2015

(86) PCT No.: PCT/KR2015/006807
§ 371 (c)(1),
(2) Date: Jan. 5, 2017

(87) PCT Pub. No.: WO2016/006867
PCT Pub. Date: Jan. 14, 2016

(65) Prior Publication Data
US 2017/0202019 A1  Jul. 13, 2017

Related U.S. Application Data

(60) Provisional application No. 62/022,217, filed on Jul. 9, 2014.

(51) Int. Cl.
*H04W 74/08* (2009.01)
*H04W 16/14* (2009.01)
*H04W 72/04* (2009.01)
*H04W 74/00* (2009.01)
(Continued)

(52) U.S. Cl.
CPC ....... *H04W 74/0808* (2013.01); *H04W 16/14* (2013.01); *H04W 72/0453* (2013.01);
(Continued)

(58) Field of Classification Search
None
See application file for complete search history.

(56) References Cited

U.S. PATENT DOCUMENTS

2013/0114586 A1  5/2013  Kim et al.
2014/0126504 A1  5/2014  Jung et al.
(Continued)

FOREIGN PATENT DOCUMENTS

WO   2013022254 A2   2/2013
WO   2013149387 A1  10/2013

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.4.0, Dec. 2011, 101 pages.
(Continued)

*Primary Examiner* — Chi H Pham
*Assistant Examiner* — Raul Rivas
(74) *Attorney, Agent, or Firm* — Lee, Hong, Degerman, Kang & Waimey

(57) ABSTRACT

A method according to the disclosure of the present specification may include the steps of: acquiring information about an operating channel of at least one BSS located in the neighboring area of a terminal, from a beacon signal periodically transmitted by at least one AP included in a wireless LAN system; reporting the information about the operating channel to a mobile communication base station; receiving information about a first channel bandwidth included in an unlicensed band from the mobile communication base sta-
(Continued)

tion, wherein the information about the first channel bandwidth is acquired on the basis of the information about the operating channel by the mobile communication base station; transmitting a CTS frame defined in the wireless LAN system on the first channel bandwidth; and receiving a data channel from the mobile communication base station through an LTE frame, on a second channel bandwidth included in the unlicensed bandwidth.

10 Claims, 28 Drawing Sheets

(51) Int. Cl.
    *H04W 84/12* (2009.01)
    *H04W 88/08* (2009.01)
    *H04W 48/10* (2009.01)

(52) U.S. Cl.
    CPC .......... *H04W 74/006* (2013.01); *H04W 48/10* (2013.01); *H04W 84/12* (2013.01); *H04W 88/08* (2013.01)

(56) References Cited

U.S. PATENT DOCUMENTS

| | | | |
|---|---|---|---|
| 2014/0185497 A1 | 7/2014 | Wolf et al. | |
| 2015/0351095 A1* | 12/2015 | Wilhelmsson | H04W 72/0453 370/329 |
| 2016/0081010 A1* | 3/2016 | Seok | H04W 74/0816 |

OTHER PUBLICATIONS

3rd Generation Partnership Project, "Technical Specification Group Radio Access Network; Evolved Universal Terrestrial Radio Access (E-UTRA); Multiplexing and channel coding (Release 10)", 3GPP TS 36.212 V10.2.0, Jun. 2011, section 5.3.3.1.1., pp. 56-57 (4 pages provided).

PCT International Application No. PCT/KR2015/006807, International Search Report dated Oct. 30, 2015, 4 pages.

* cited by examiner

FIG. 9
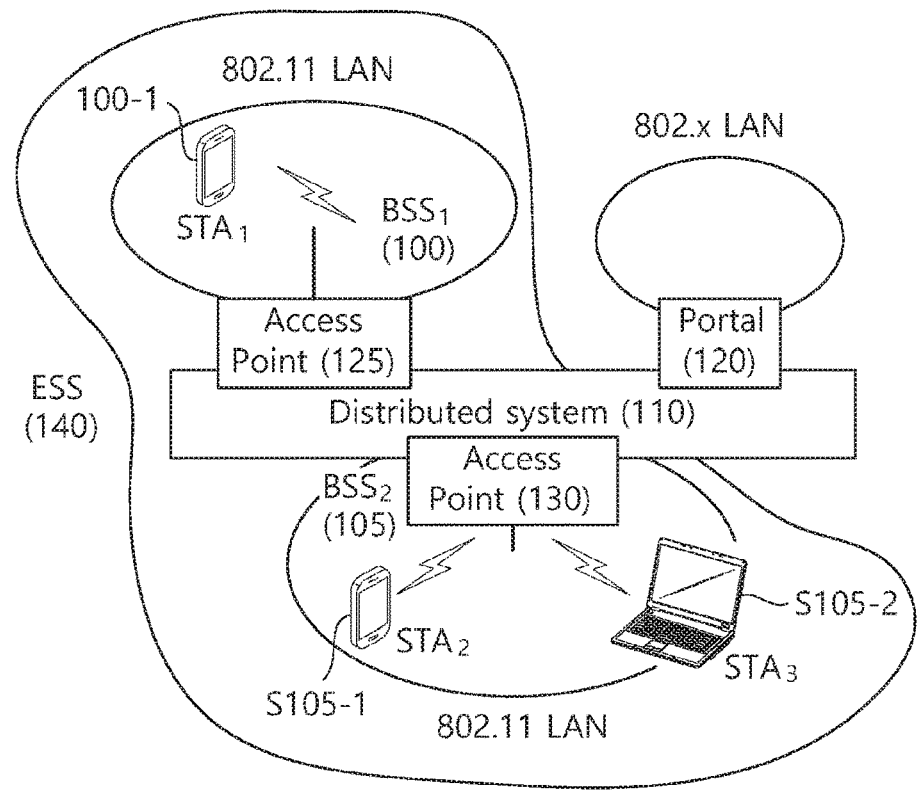
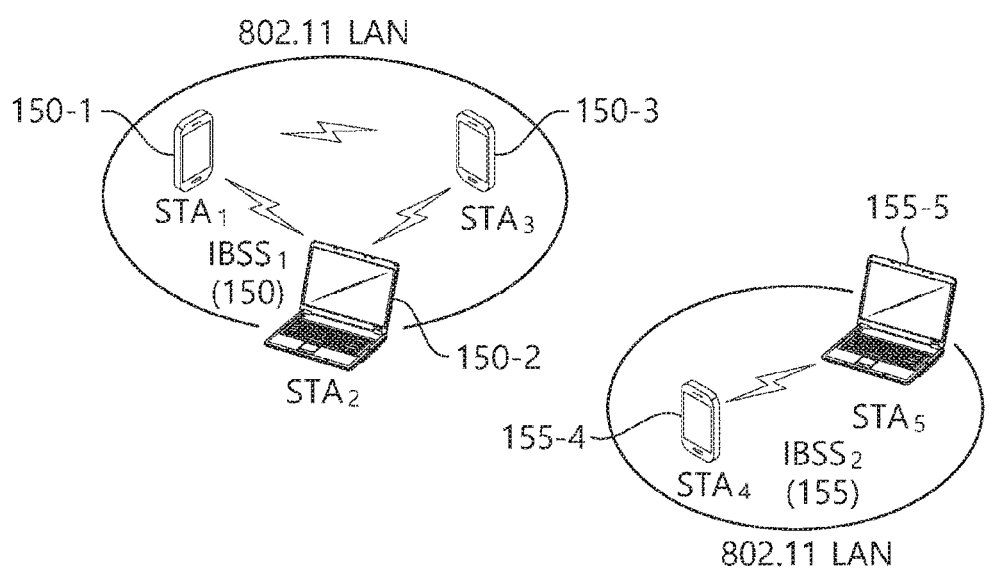

— Operating channel (secondary channel)
---- Primary 20MHz channel

METHOD AND TERMINAL FOR RECEIVING DATA THROUGH UNLICENSED BAND IN MOBILE COMMUNICATION SYSTEM

CROSS-REFERENCE TO RELATED APPLICATIONS

This application is the National Stage filing under 35 U.S.C. 371 of International Application No. PCT/KR2015/006807, filed on Jul. 2, 2015, which claims the benefit of U.S. Provisional Application No. 62/022,217, filed on Jul. 9, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, as more communication devices require more communication capacities, efficient utilization of limited frequency band in the next-generation wireless communication system has become more important requirement.

In a cellular communication system such as the LTE system, it is also considering a method to utilize, to offload traffic, an unlicensed band such as 2.4 GHz band on which an existing WLAN system uses or an unlicensed band such as 5 GHz band which has recently got attention.

Basically, since the unlicensed band assumes a method of transmitting and receiving wirelessly with a contention between each communication node, it requires to confirm that other communication nodes do not transmit a signal, by performing, by the each communication node, a channel sensing, before transmitting a signal. This is called as a CCA (Clear Channel Assessment), a base station (eNB) or an user equipment (UE) of the LTE system should be also able to perform the CCA to transmit a signal in the unlicensed band (for convenience, referred to as a LTE-U band).

Further, the other communication nodes such as WLAN etc., as well do not trigger any interference, by performing the CCA, when the eNB or the UE in the LTE system transmit a signal. For instance, a CCA threshold in the WLAN standard (801.11ac), is regulated to be as −62 dBm for the non-WLAN signal, and −82 dBm for the WLAN signal, which means that the STA or the AP, for instance, does not transmit a signal in order not to trigger any interference, if any signal other than the WLAN signal is received with the power of more than −62 dBm.

Specifically, the STA or the AP, in the WLAN system, may perform the CCA and a signal transmission unless any signal with the level of greater than CCA threshold, is detected for more than 4 us.

Specifically, a process is started when a node wishing to transmit data transmits RTS (Request To Send) frame in WLAN.

A destination node responds to the signal by transmitting a CTS (Clear To Send) frame, in a wireless environment when there are no other signals of being transmitting and receiving and thus the transmission is available.

All other nodes receiving the RTS frame or the CTS frame is prevented from transmitting data for a determined time. A time when the transmission is prevented may be indicated by information included in the RTS frame or the CTS frame. This protocol set forth a premise that all nodes have the same transmission range.

RTS/CTS are an additional and selective method for implementing CSMA/CA (Carrier Sense Multiple Access with Collision Avoidance) virtual carrier sensing.

Since only a physical carrier sensing is used in the basic 802.11 (WLAN) standard, there is a problem that a hidden node or terminal problem may be occurred.

SUMMARY OF THE INVENTION

Accordingly, the disclosure of the specification has been made in an effort to solve the problem.

To achieve the above-mentioned object, a method in accordance with a disclosure of the present specification, is a method of receiving data by a terminal using both a licensed band and an unlicensed band for communicating with a mobile communication base station, the method comprises the steps of: acquiring information about an operating channel of at least one Basic Service Set (BSS) positioned on a neighboring area of the UE from a beacon signal periodically transmitted by at least one AP (Access Point) included in a WLAN (Wireless Local Area Network) system; reporting the information on the operating channel to the mobile communication base station; receiving information on a first channel bandwidth included in the unlicensed band from the mobile communication base station, wherein the information on a first channel bandwidth is acquired by the mobile communication base station based on the information on the operating channel; transmitting a CTS (Clear To Send) frame defined in the WLAN system on the first channel bandwidth; and at a specific frame or a specific subframe, receiving the data channel from the mobile communication base station on a second channel bandwidth included in the unlicensed band, after transmitting the CTS frame, and wherein the specific frame or the specific subframe in which the data channel is received, may be a frame or a subframe used in a mobile communication system operated on the licensed band.

Herein, the first channel bandwidth may be a Primary channel bandwidth which should be necessarily used to be included therein and used when the at least one BSS transmits and receives data, and wherein the second channel bandwidth may be a Primary channel bandwidth which should be necessarily used, when transmitting and receiving data between the mobile communication base station and the UE.

Further, the Unlicensed Band may have a bandwidth corresponding to any one of 40 MHz, 80 MHz, and 160

MHz, and wherein the primary channel used by the at least one BSS or the primary channel used when transmitting and receiving data between the mobile communication base station and the UE has a bandwidth of 20 MHz.

Further, the mobile communication bas station may transmit a RTS (Request To Send) frame defined in the WLAN system on the first channel bandwidth, before transmitting the data channel to the UE.

Further, the information on the operating channel may include information related to at least one of an operation bandwidth in which at least one channel is included, being used when the at least one BSS transmits and receives data, a location of a center frequency on the at least one channel, a location of the primary channel on the at least one BSS and an Identification (ID) on the at least one BSS.

Further, the information on the first channel bandwidth may be transmitted via a PDCCH (Physical Downlink Control Channel), EPDCCH (Enhanced Physical Downlink Control Channel) or a higher layer signaling.

To achieve the above-mentioned object, a terminal in accordance with a disclosure of the present specification, is a terminal of using both a licensed band and unlicensed band for communicating with a mobile communication base station, comprising: a RF (Radio Frequency) unit; and a processor configured to control the RF unit operable to: acquire information on an operating channel of at least one Basic Service Set (BSS) positioned on a neighboring area of the UE from a beacon signal periodically transmitted by at least one AP (Access Point) included in a WLAN (Wireless Local Area Network) system, report the information on the operating channel to the mobile communication base station, receiving information on a first channel bandwidth included in the unlicensed band from the mobile communication base station, wherein the information on a first channel bandwidth is acquired by the mobile communication base station based on the information on the operating channel, transmit a CTS (Clear To Send) frame defined in the WLAN system on the first channel bandwidth, and at a specific frame or a specific subframe, receive the data channel on a second channel bandwidth included in the unlicensed band from the mobile communication base station, after transmitting the CTS frame, and wherein the specific frame or the specific subframe in which the data channel is received, may be a frame or a subframe used in a mobile communication system operated on the licensed band.

According to the present invention, the above-mentioned problem will be solved. More specifically, in a wireless communication system using both the licensed band and the unlicensed band, there are merits that the hidden node problem will be solved, by transmitting and receiving the data frame on the RTS and/or CTS frame in a stable and efficient manner.

BRIEF DESCRIPTION OF THE DRAWINGS

FIG. 9 is a conceptual diagram illustrating a structure of a wireless local area network (WLAN).

DESCRIPTION OF EXEMPLARY EMBODIMENTS

Figure 1:
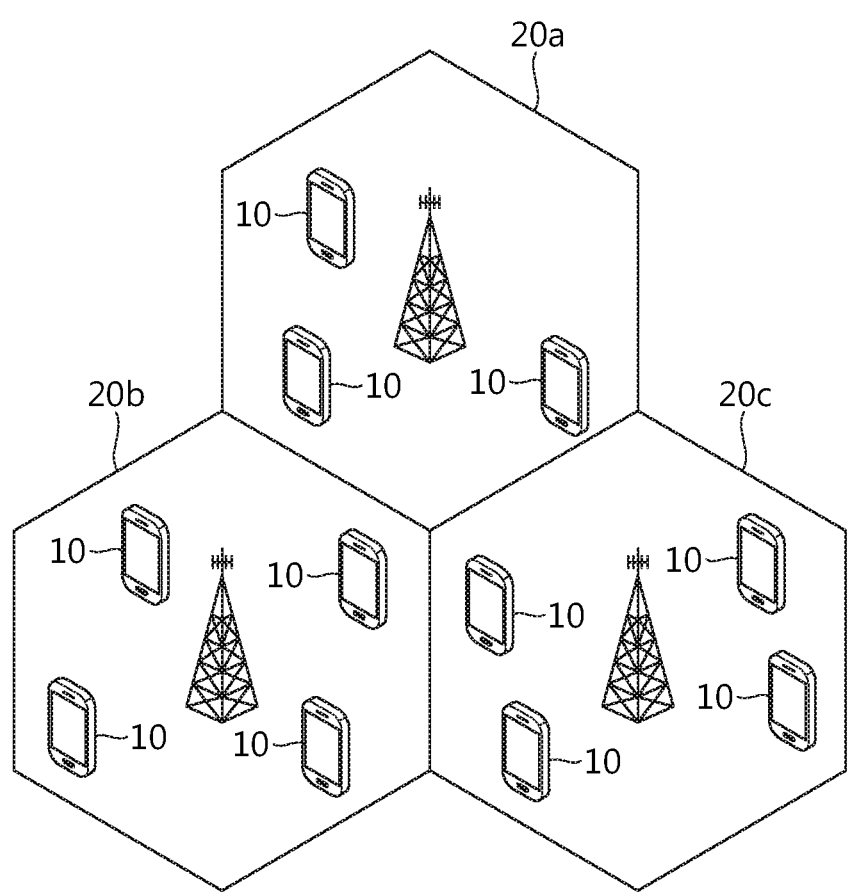
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
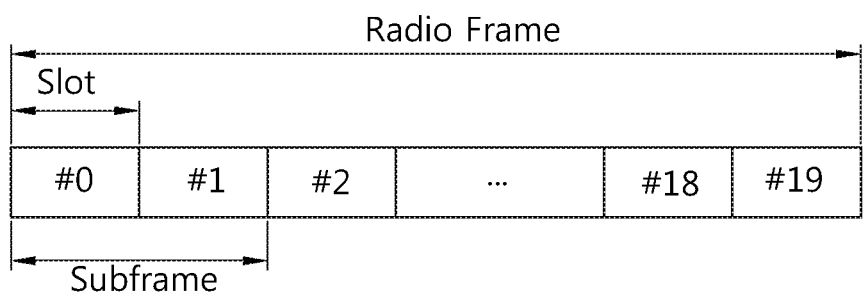
FIG. 2 illustrates a structure of a radio frame according to frequency division duplex (FDD) of 3rd generation partnership project (3GPP) long term evolution (LTE).

FIG. 2 illustrates a structure of a radio frame according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
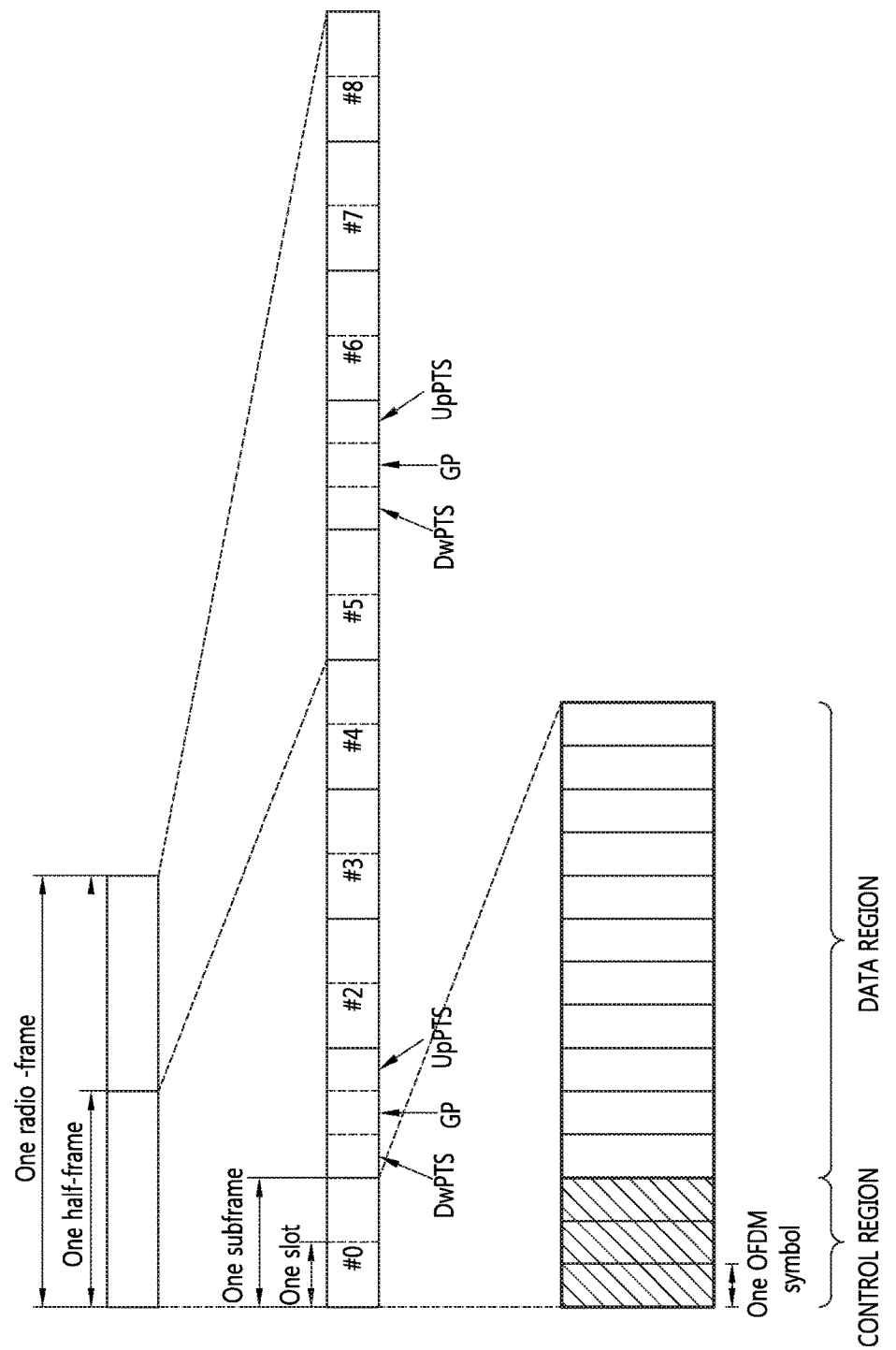
FIG. 3 is a block diagram showing the structure of a wireless protocol on the control plane.

FIG. 3 illustrates a structure of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

Figure 4:
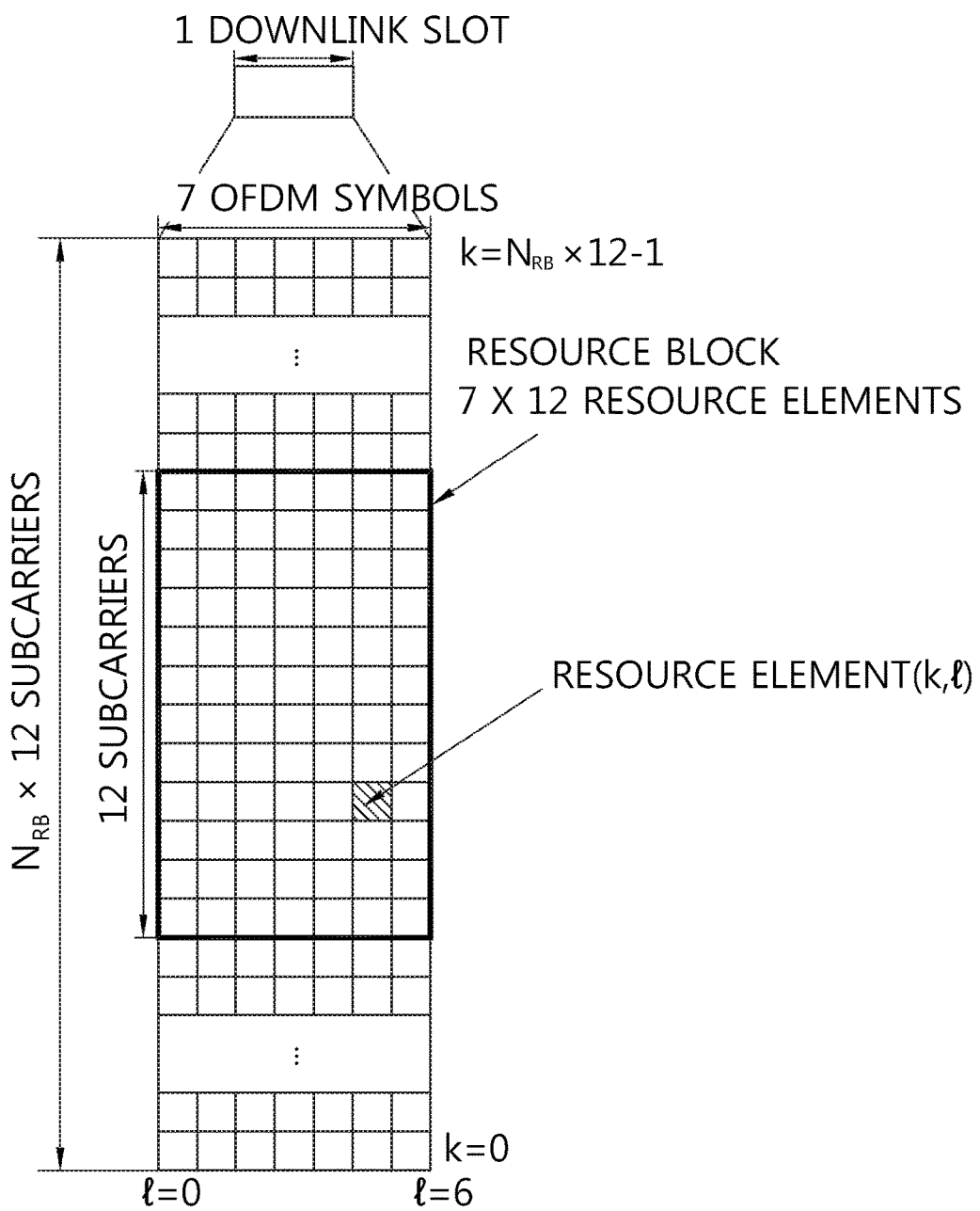
FIG. 4 illustrates an example of a resource grid for one uplink or downlink slot in 3GPP LTE.

FIG. 4 illustrates an example of a resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
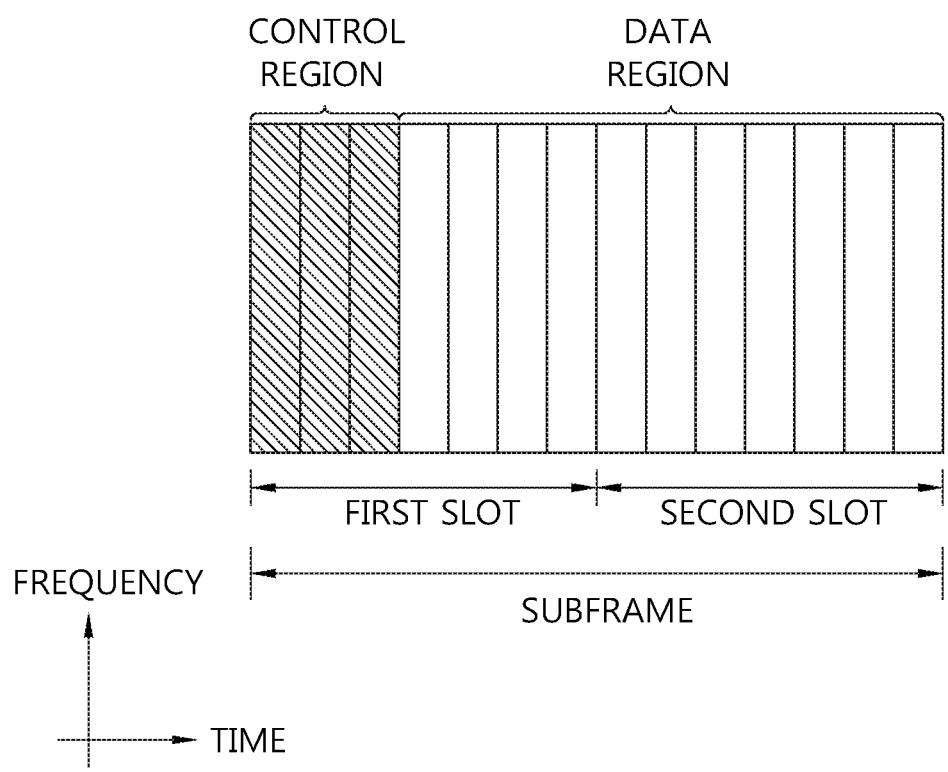
FIG. 5 illustrates a structure of a downlink subframe.

FIG. 5 illustrates a structure of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is transmitted on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be transmitted in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be transmitted to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be transmitted to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which location within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
| --- | --- |
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, DCI format 0 includes fields listed in the following table with reference to section 5.3.3.1.1 of 3GPP TS 36.212 V10.2.0 (2011-06)

TABLE 4

| Field | Number of bits |
| --- | --- |
| Carrier indicator | 0 or 3 bits |
| Flag for format0/format1A differentiation | 1 bit |
| FH(Frequency hopping) flag | 1 bit |
| Resource block assignment and hopping resource allocation | |
| MCS(Modulation and coding scheme) and RV(redundancy version) | 5 bits |
| NDI(New data indicator) | 1 bit |
| TPC | 2 bits |
| Cyclic shift for DM RS and OCC index | 3 bits |
| UL index | 2 bits |
| DAI(Downlink Assignment Index) | 2 bit |
| CSI request | 1 or 2 bits |
| SRS request | 0 or 1 bits |
| Resource allocation type | 1 bit |

Figure 6:
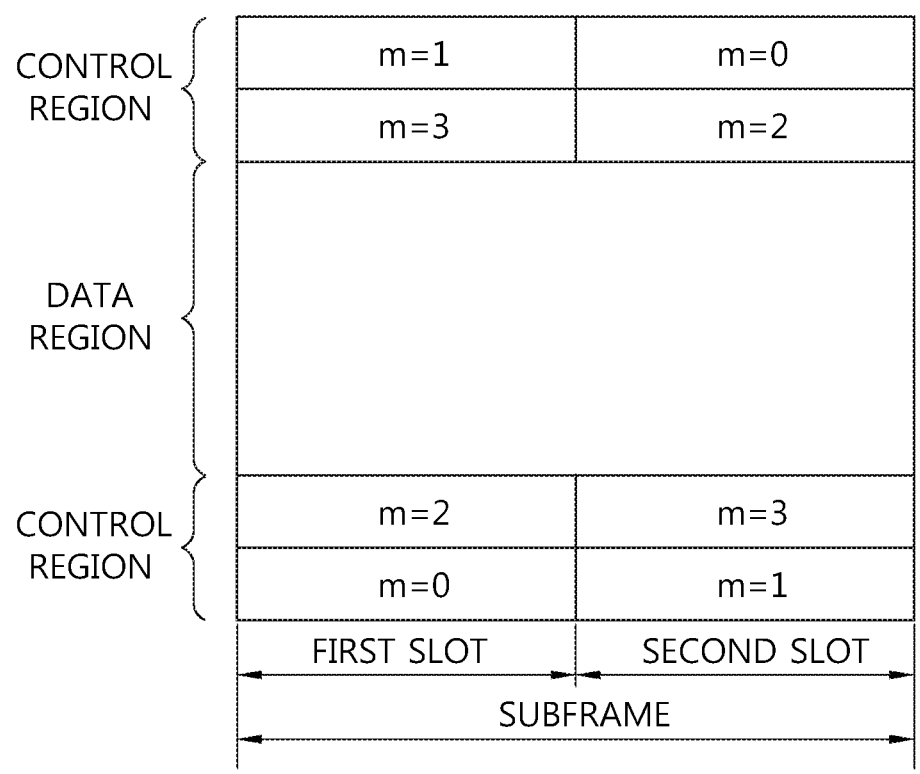
FIG. 6 illustrates a structure of an uplink subframe in 3GPP LTE.

FIG. 6. illustrates a structure of an uplink subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for transmission of data (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

Figure 7:
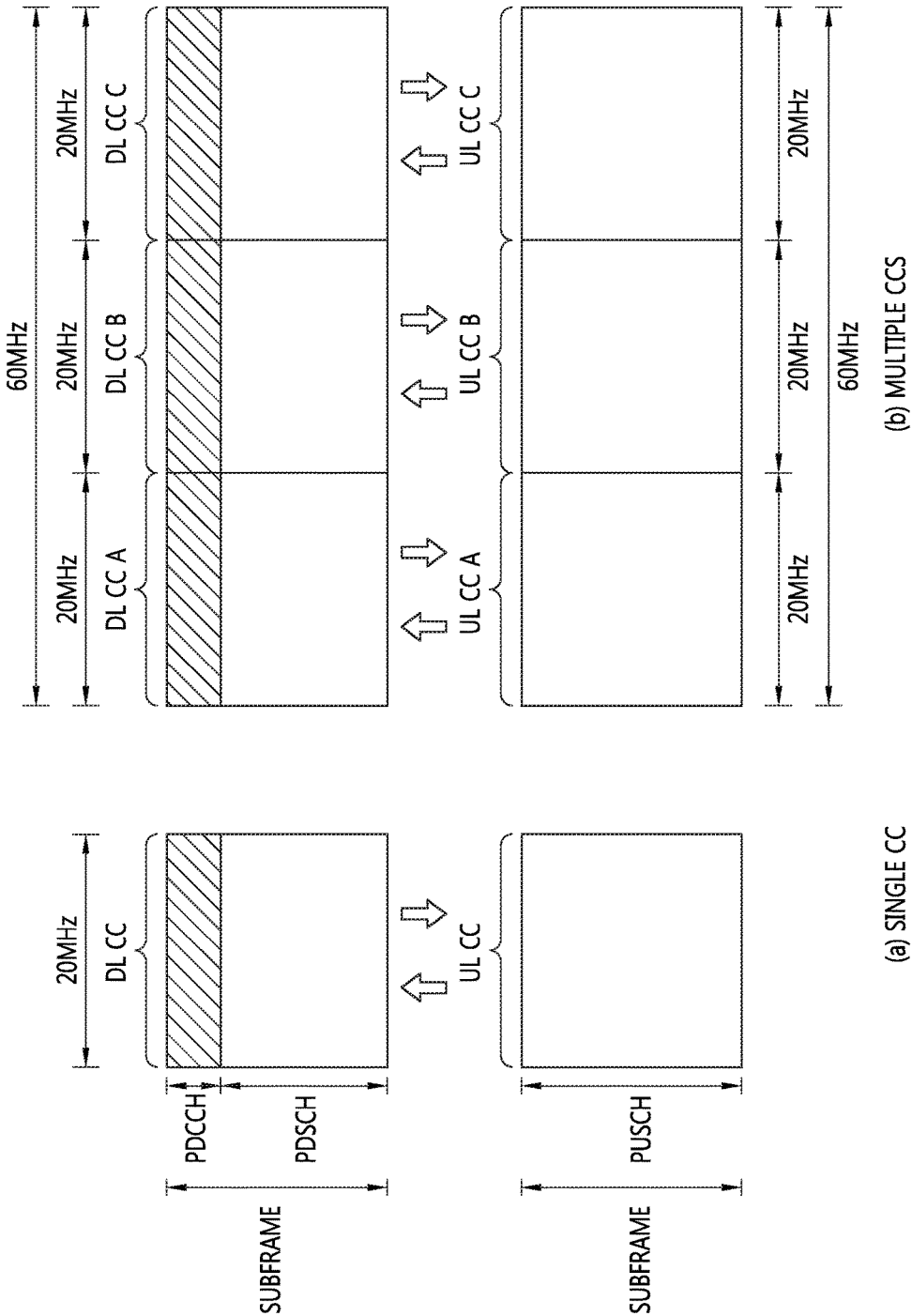
FIG. 7 illustrates an example of comparison between a single carrier system and a carrier aggregation system.

FIG. 7 illustrates an example of comparison between a single carrier system and a carrier aggregation system.

Referring to (a) of FIG. 7, the single carrier system supports only one carrier for an uplink and a downlink for a UE. Although there may be various bandwidths of carriers, a UE is assigned one carrier. Referring to (b) of FIG. 7, the carrier aggregation (CA) system may assign a plurality of component carriers (DL CC A to C and UL CC A to C) for a UE. A component carrier (CC) denotes a carrier used in the carrier aggregation system and may be abbreviated to a carrier. For example, three 20-MHz component carriers may be assigned to allocate a 60-MHz bandwidth for the terminal.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

Figure 8:
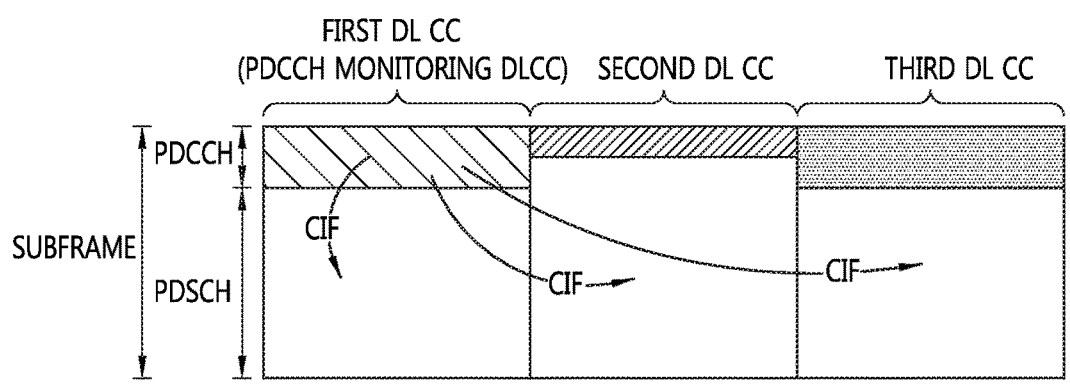
FIG. 8 illustrates cross-carrier scheduling in a carrier aggregation system.

FIG. 8 illustrates cross-carrier scheduling in a carrier aggregation system.

Referring to FIG. 8, a BS may configure a PDCCH monitoring DL CC (monitoring CC) set. The PDCCH monitoring DL CC set includes some of all aggregated DL CCs, and a UE performs PDCCH monitoring/decoding only on a DL CC included in the PDCCH monitoring DL CC set when cross-carrier scheduling is configured. That is, the BS transmits a PDCCH with respect to a PDSCH/PUSCH to be scheduled only through a DL CC included in the PDCCH monitoring DL CC set. The PDCCH monitoring DL CC set may be configured to be UE-specific, UE group-specific, or cell-specific.

FIG. 8 illustrates an example in which three DL CCs (DL CC A, DL CC B, and DL CC C) are aggregated and DL CC A is set as a PDCCH monitoring DL CC. A UE may receive a DL grant with respect to a PDSCH of DL CC A, DL CC B, and DL CC C through a PDCCH of DL CC A. DCI transmitted through the PDCCH of DL CC A includes a CIF to indicate which DL CC the DCI is about.

Hereinafter, a wireless local area network (WLAN) system will be discussed in detail.

In addition, the present specification quotes together contents disclosed in a IEEE standard 802.11™ (2012) and 802.11 ac™ (2013).

FIG. 9 is a conceptual diagram illustrating a structure of a wireless local area network (WLAN).

An upper part of FIG. 9 shows the structure of the IEEE (institute of electrical and electronic engineers) 802.11 infrastructure network.

Referring to the upper part of FIG. 9, the WLAN system may include one or more infra-structure BSSs 100 and 105 (as will be described as BSS in below). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to one AP 130.

The BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected through the distribution system 110. The APs included in one ESS 140 may have the same SSID (service set identification).

The portal 120 may function as a bridge that performs connection of the WLAN network (IEEE 802.11) with other network (for example, 802.X).

In the BSS as shown in the upper part of FIG. 9, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 9 is a conceptual diagram illustrating an independent BSS.

Referring to the lower part of FIG. 9, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may be used, in its broad sense definition, including both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 10A:
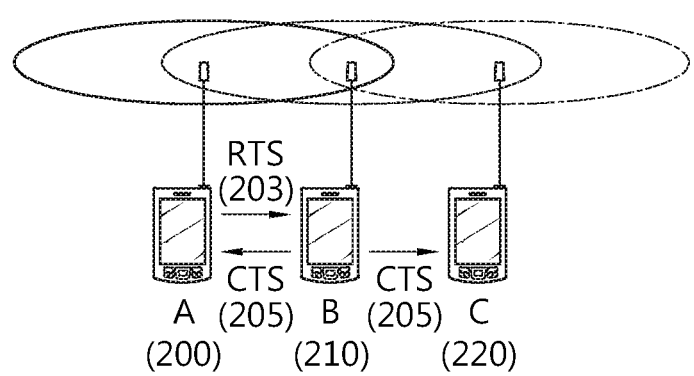
FIG. 10A and FIG. 10B is a conceptual diagram illustrating a structure of the WLAN system.
Figure 10B:
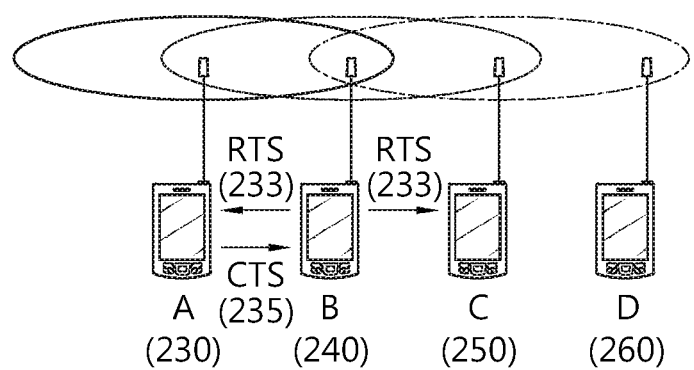

FIG. 10A and FIG. 10B is a conceptual diagram illustrating a structure of the WLAN system.

Referring to FIG. 10A and FIG. 10B, in order to solve a hidden node issue and an exposed node issue, short signaling frames, such as an RTS frame and a CTS frame etc. may be used. Surrounding STAs may be aware of whether or not data between two STAs is transmitted or received, based on the RTS frame and the CTS frame.

FIG. 10A shows a method of transmitting an RTS frame 203 and a CTS frame 205 in order to solve a hidden node issue.

The case may be assumed that both a STA A 200 and a STA C 220 attempt to transmit data to an STA B 210. The STA A 200 may transmit the RTS frame 203 to the STA B 210 before transmitting a data frame, the STA B 210 may transmit the CTS frame 205 to the STA A 200. A STA C 220 may overhear the CTS frame 205 and may be aware of a transmission of frame from the STA A 200 through a medium to the STA B 210. The STA C 220 may configure a network allocation vector (NAV) until the transmission of frame from the STA A 200 to the STA B 210. A collision may be avoided among frames due to a hidden node, by using the above-mentioned method.

FIG. 10B shows a method of transmitting an RTS frame 233 and a CTS frame 235 in order to solve an exposed node issue.

A STA C 250 may determine whether a collision is occurred or not, when a frame is transmitted to another STA 260, based on a monitoring on the RTS frame 233 and the CTS frame 235 between a STA A 230 and a STA B 240.

The STA B 240 may transmit the RTS frame 233 to the STA A 230, the STA A 230 may transmit the CTS frame 235 to the STA B 240. The STA C 250 has overheard only the RTS frame 233 transmitted by the STA B 240 and has not overheard the CTS frame 235 transmitted by the STA A 230. Thus, the STA C 250 may be aware that the STA A 230 is placed outside the carrier sensing range of the STA C 250. Accordingly, the STA C 250 can transmit data to the STA D 260.

The RTS frame format and the CTS frame format are disclosed in the 8.3.1.2 RTS frame format and 8.3.1.3 CTS frame format of an IEEE P802.11-REVmcTM/D2.0, October 2013.

Figure 11A:
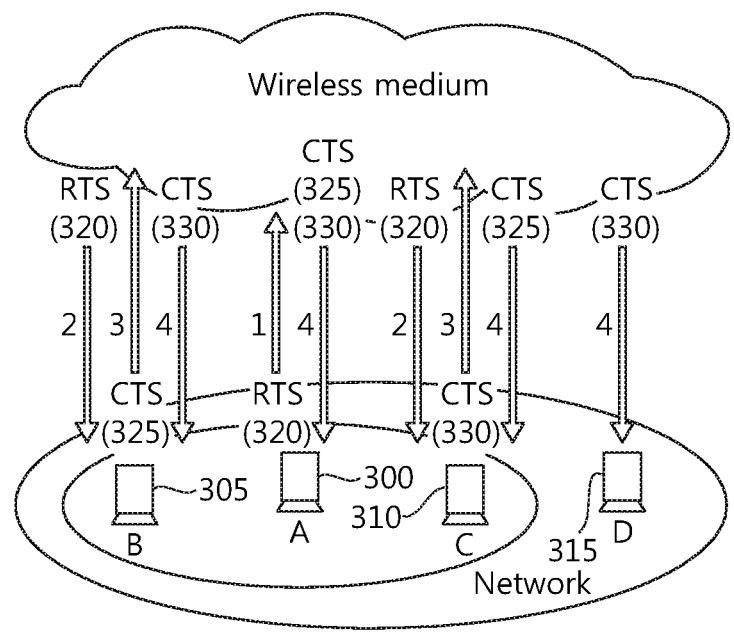
FIG. 11A and FIG. 11B is a conceptual diagram showing a CTS-to-self mechanism.
Figure 11B:
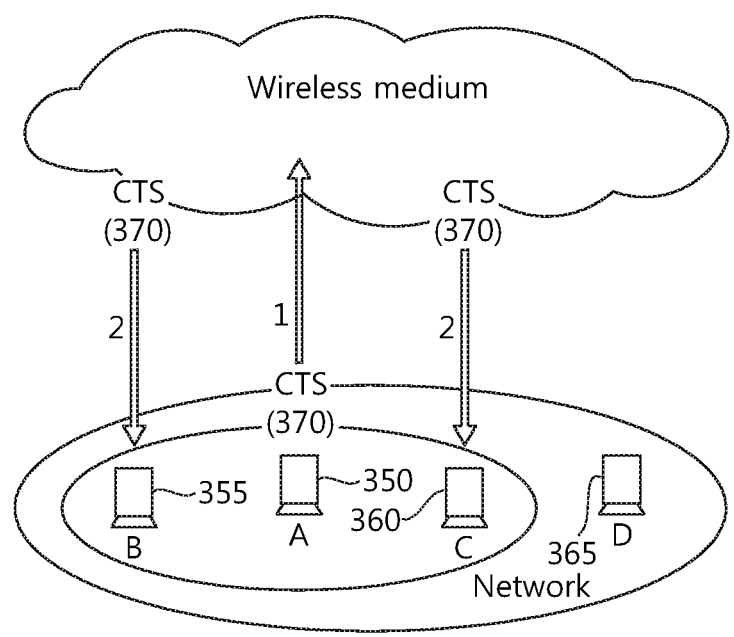

FIG. 11A and FIG. 11B is a conceptual diagram showing a CTS-to-self mechanism.

Referring to FIG. 11A and FIG. 11B, they show a comparison between a case (FIG. 11A) where a medium is sensed using an RTS frame and CTS frame exchange method and a case (FIG. 11B) where a medium using a CTS-to-self frame is sensed.

In the IEEE 802.11g standard, a CTS-to-self protection mechanism has been defined. The CTS-to-self protection mechanism may be used instead of a medium sensing mechanism using an RTS frame and a CTS frame. If the CTS-to-self protection mechanism is used, the overhead of a medium can be reduced as compared with the case where a medium sensing mechanism using RTS/CTS frames is used.

Referring to FIG. 11A, a method of exchanging an RTS frame and a CTS frame before a transmission STA transmits a data frame may be performed as follows.

In FIG. 11A, it is assumed that a STA A 300 attempts to transmit a data frame to a STA C 310.

1) First, the STA A 300 transmits an RTS frame 320.

2) The RTS frame 320 is received by a STA B 305 and the STA C 310 that are present in its carrier sensing range.

3) The STA B 305 and the STA C 310 transmit CTS frames 325 and 330.

4) The transmitted CTS frames 325 and 330 are transmitted to the STA A 300, the STA B 305, the STA C 310, and an STA D 315.

The STA D 315 has not received the RTS frame 320 from the STA A 300 because it is placed outside the carrier sensing range of the STA A 300 (i.e., the STA D 315 is a hidden node of the STA A 300). However, the STA D 315 may be aware that the STA A 300 has occupied a medium in order to transmit data by receiving the CTS frame 330 from the STA C 310. The STA D 315 may configure the NAV and may not access the medium.

5) The STA A 300 transmits the data frame to the STA C 310.

Referring to FIG. 11B, a medium sensing method using a CTS-to-self frame, performed before a transmission STA transmits a data frame, may be performed as follows. In FIG. 11B, it is assumed that an STA A 350 attempts to transmit a data frame to an STA C 360.

1) The STA A 350 transmits a CTS-to-self frame 370 to an STA B 355 and the STA C 360 that are present in its carrier sensing range.

2) The STA B 355 and the STA C 360 that have received the CTS-to-self frame defer the transmission of other data frames in order to receive a data frame from the STA A 350.

If such a method is used, an STA D 365 placed outside the coverage area of the STA A 350 does not receive a CTS frame 370 from the STA A 350. Accordingly, the STA D 365 may be not aware of whether or not data is transmitted by the STA A 350.

In such a case, a collision may occur between data frames when the STA D 365 transmits a data frame to the STA A 350 or the STA C 360. That is, the method using the CTS-to-self frame 370 cannot solve a hidden node issue. Accordingly, the method using the CTS-to-self frame 370 needs to be applied to only a case where the transmission of data frames between STAs can be sensed, and in other cases, a medium needs to be sensed using the RTS/CTS frame exchange method.

An access point (AP) operating in a wireless local area network (WLAN) system may transmit data through the same time resource to each of a plurality of stations (STAs). If transmission from the AP to the STA is referred to as downlink transmission and transmission from the STA to the AP is referred to as uplink transmission, transmission of the AP may be expressed by a term as a DL MU transmission (or a downlink multi-user transmission).

In an existing WLAN system, an AP may perform DL MU transmission based on MU multiple input multiple output (MIMO), which may be referred to as DL MU MIMO transmission. In an embodiment of the present disclosure, the AP may perform DL MU transmission based on an orthogonal frequency division multiplexing access (OFDMA), which may be referred to as a term of DL MU OFDMA transmission. When DL MU OFDMA transmission is used, the AP may transmit a downlink frame to each of a plurality of STAs through each of a plurality of frequency resources (or sub-bands) on an overlapping time resource.

A PPDU, frame, and data transmitted through downlink transmission may be referred to as a term of a downlink PPDU, a downlink frame and downlink data. A PPDU may be data unit including a PPDU header and a physical layer service data unit (PSDU) (or MPDU (MAC protocol data unit)). The PPDU header may include a PHY header and a PHY preamble, and the PSDU (or MPDU) may include or indicate a frame.

On the contrary, the transmission from an STA to an AP may be referred to as an uplink transmission. Transmission data from a plurality of STAs to the AP on the same time resource may be referred to as a term of an uplink multi-user (UL MU) transmission. Unlike in the existing WLAN system, the WLAN system in accordance with the embodiment of the present disclosure may be support UL MU transmission. A PPDU, frame, and data transmitted through uplink transmission may be referred to as a term of an uplink PPDU, an uplink frame, and uplink data, respectively. An uplink transmission by each of a plurality of STAs may be performed on a frequency domain or a spatial domain.

When the uplink transmission by each of a plurality of STAs is performed on the frequency domain, different frequency resources may be allocated based on OFDMA for the each of the plurality of STAs as uplink transmission resources. The each of the plurality of STAs may transmit an uplink frame to the AP through different allocated frequency resources. This transmission method using different frequency resources may be referred to as a term of UL MU OFDMA transmission method.

When the uplink transmission by the each of the plurality of STAs is performed on the spatial domain, different space time streams (or spatial streams) may be allocated for the each of the plurality of STAs. The each of the plurality of STAs may transmit an uplink frame to the AP through different space time streams. This transmission method using different spatial streams may be referred to as a term of UL MU MIMO transmission method.

Hereinafter, a disclosure of the present specification will be discussed in detail.

<The Disclosure of the Present Specification>

A term of base station used hereinafter, is used as a comprehensive terminology including a remote radio head (RRH), an eNB (eNodeB), a transmission point (TP), a reception point (RP), a relay and so on. Hereinafter, a proposed method hereinafter will be explained based on a 3GPP LTE system for the purpose of explanation. However, a scope to which the proposed method will be applied may be extendable to other systems, in addition to the 3GPP LTE system.

Figure 12:
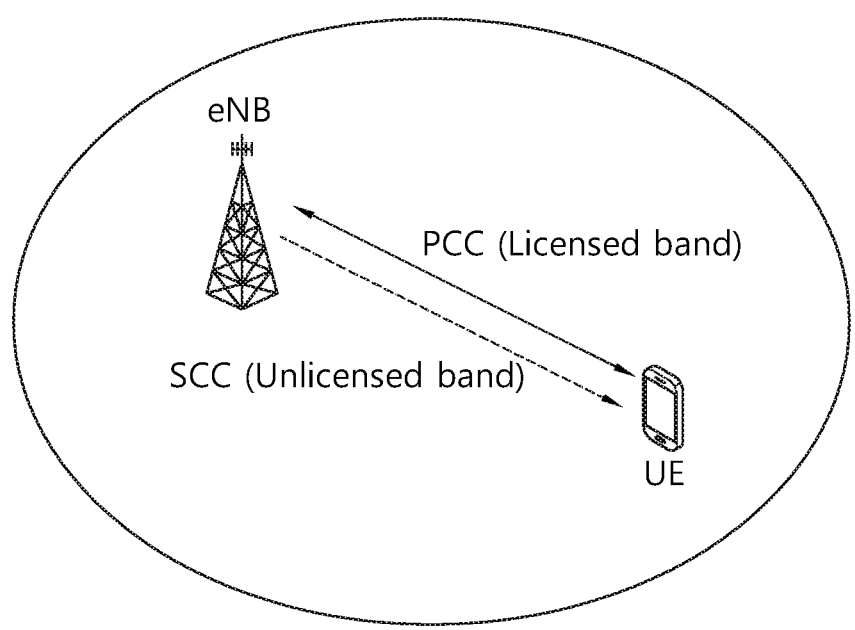
FIG. 12 shows an example of a wireless communication system of using both a licensed band and an unlicensed band.

FIG. 12 shows an example of a wireless communication system of using both a licensed band and an unlicensed band.

Referring to FIG. 12, in order to transmit or receive a signal through a carrier of the unlicensed band in which an exclusive use by a specific system is not guaranteed, technologies described in the present specification may allow for the base station to transmit a signal to the UE or for the UE to transmit a signal to the base station in a carrier aggregation case of both the licensed band (e.g. LTE or LTE-A band) and the unlicensed band as shown in FIG. 12.

Hereinafter, for the purpose of explanation of the proposed method, it has been assumed as a case that the UE is configured to perform a wireless communication through two component carriers (CCs) in the licensed band and the unlicensed band, respectively.

Herein, as an example, the carrier of the licensed band may be interpreted as a primary CC (referred to as PCC or PCell), while the carrier of the unlicensed band may be interpreted as a secondary CC (referred to as SCC or SCell).

However, the proposed methods and solutions in the disclosure of the present specification may be applicable to be extended to the case that a plurality of licensed band sand a plurality of unlicensed bands are utilized in a carrier aggregation scheme, further applicable to the case that a transmission and reception of signal is made between the base station and the UE only in the unlicensed band.

Further, the proposed methods and solutions in the disclosure of the present specification may be not only applicable to 3GPP LTE system but also applicable to be extended through other featured system.

As an example of an operation in the unlicensed band operated in a contention based random access method, the base station may firstly perform a Carrier Sensing (CS), before transmitting and receiving data.

Further, the base station checks whether the current channel state of the SCell operated in the unlicensed band is busy or idle, and if the current channel state is determined as idle, then it may transmit a scheduling grant through a (E)PDCCH of the PCell (e.g. Cross Carrier Scheduling (CSS)) or a PDCCH of the SCell, and may attempt to transmit and receive data.

In the present specification for the purpose of explanation, it may be explained by explicating a base station and terminal of LTE/LTE-A system as a base station and UE, and a base station and terminal of WLAN system as an AP and a STA.

Though there are various systems used in the unlicensed band, it is an IEEE802.11 WLAN system that will give the most substantial influence especially in the LTE-A system and will be given the most substantial influence if the LTE-A system is used in the unlicensed band.

The basic operation method of WLAN system sets forth as premise on the carrier sensing of Carrier Sense Medium Access (CSMA)/Collision Avoidance (CA).

This method of carrier sensing is mandatory to all STAs including an AP in WLAN system.

Figure 13:
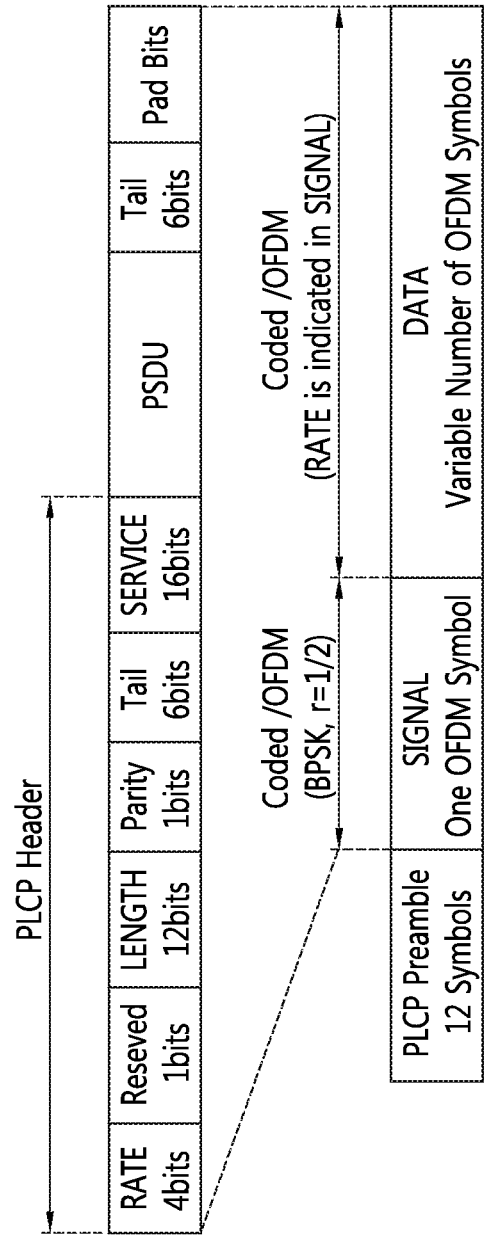
FIG. 13 shows an example a PPDU frame format in WLAN.

FIG. 13 shows an example a PPDU frame format in WLAN.

Referring to FIG. 13, the PPDU, a physical layer frame in WLAN may be configured for a Physical Layer Convergence Procedure (PLCP), a preamble, a signal field, and data.

More specifically, the PLCP preamble proceeds, and then the signal field is transmitted and then the data is transmitted.

The preamble is transmitted for the purpose of adjusting frequency and synchronization, and the later-transmitted signal (referred to as SIG hereinafter) field indicates a rate and a data transmission length of the later-transmitted data.

The SIG field is transmitted using the most powerful (lower coding rate) coding so that the largest number of STAs can accurately receive the SIG field.

Figure 14:
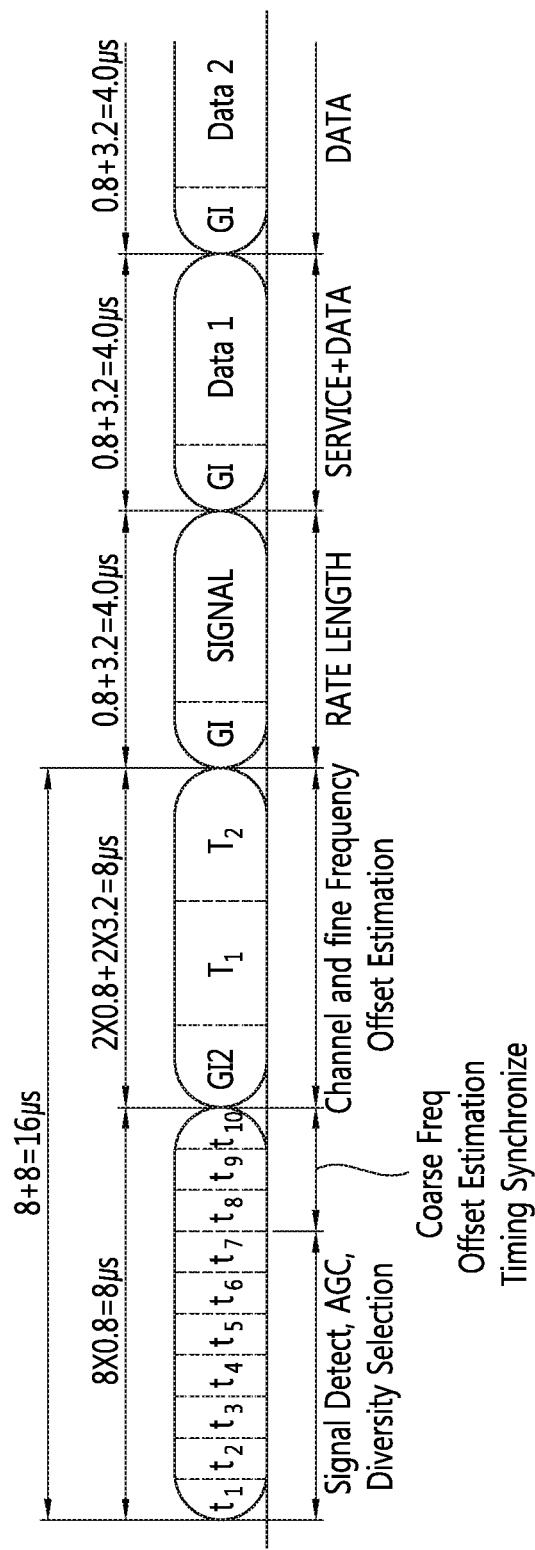
FIG. 14 shows an example of the PLCP preamble.

FIG. 14 shows an example of the PLCP preamble.

Referring to FIG. 14, it is configured for ten short symbols (STF) and two long symbols (LTF), a length of each symbol is 0.8 us when a channel bandwidth is 20 MHz. Accordingly, the STF having a length of Bus and the LTF having a length of Bus configures the PLCP preamble of 16 us.

The STF and the LTF is designed for different purposes, and the STF is for signal detection, and an adjustment of a coarse frequency offset and time synchronization, while the LTF is for more accurate frequency offset and channel estimation.

The SIG field is positioned subsequent to the PLCP preamble. Timing values shown in FIG. 14 are values which correspond to when a channel bandwidth is 20 MHz, will be twice when the channel bandwidth is decreased to 10 MHz, and will be four times when the channel bandwidth is decreased to 5 MHz.

A process is started when a node wishing to transmit data transmits a Request To Send (RTS) frame in WLAN. A destination node responds to the signal by transmitting a Clear To Send (CTS) frame, in a wireless environment when there are no other signals of being transmitting and receiving and thus the transmission is available.

All other nodes receiving the RTS frame or the CTS frame is prevented from transmitting data for a determined time.

Information on a time when the transmission is prevented is transmitted, included in the RTS frame or the CTS frame. This protocol set forth a premise that all nodes have the same transmission range.

RTS/CTS is an additional and selective method for implementing a Carrier Sense Multiple Access with Collision Avoidance (CSMA/CA) virtual carrier sensing.

A hidden node or terminal problem may be issued because only a physical carrier sensing is used in the basic 802.11 (WLAN) standard.

A RTS/CTS packet size limit value is configured to a node, when a RTS/CTS mechanism is used.

The RTS/CTS packet size limit value has values between 0 to 2347 octets. In general, if a size of packet is less than the RTS/CTS packet size, then the RTS/CTS frame is not transmitted. That is, a RTS/CTS exchange is started only if the size of packet to be transmitted is greater than the limit value. In other cases, data frame is immediately transmitted. Expected time for requiring transmitting data is written in the RTS/CTS packet, and a node which is not related to transmit during the expected time, will be in a holding state without transmitting Thus, the disclosures of the present specification proposes a scheme to occupy using a medium, by transmitting a WLAN signal (e.g. RTS, CTS, preamble (L-SIG)) so that a LTE system operated in the unlicensed band can coexist with a WLAN system.

Figure 15:
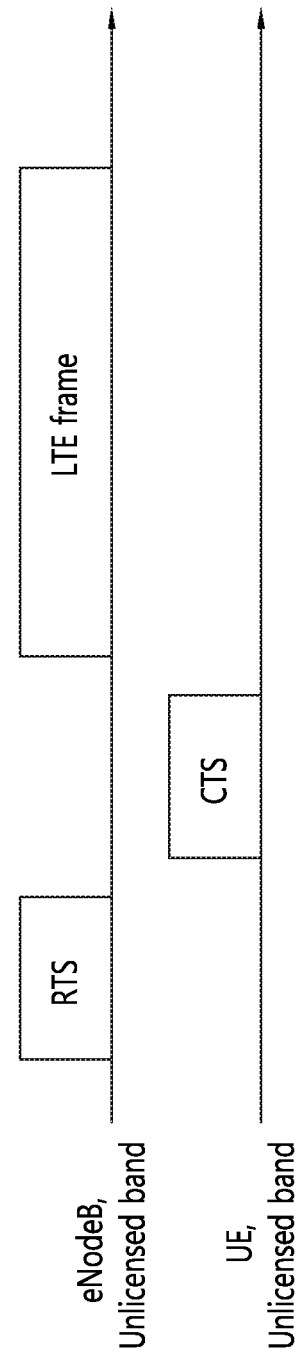
FIGS. 15-16 are an exemplary diagram showing a method to occupy a medium, in accordance with the first method of the first disclosure of the present specification.
Figure 16:
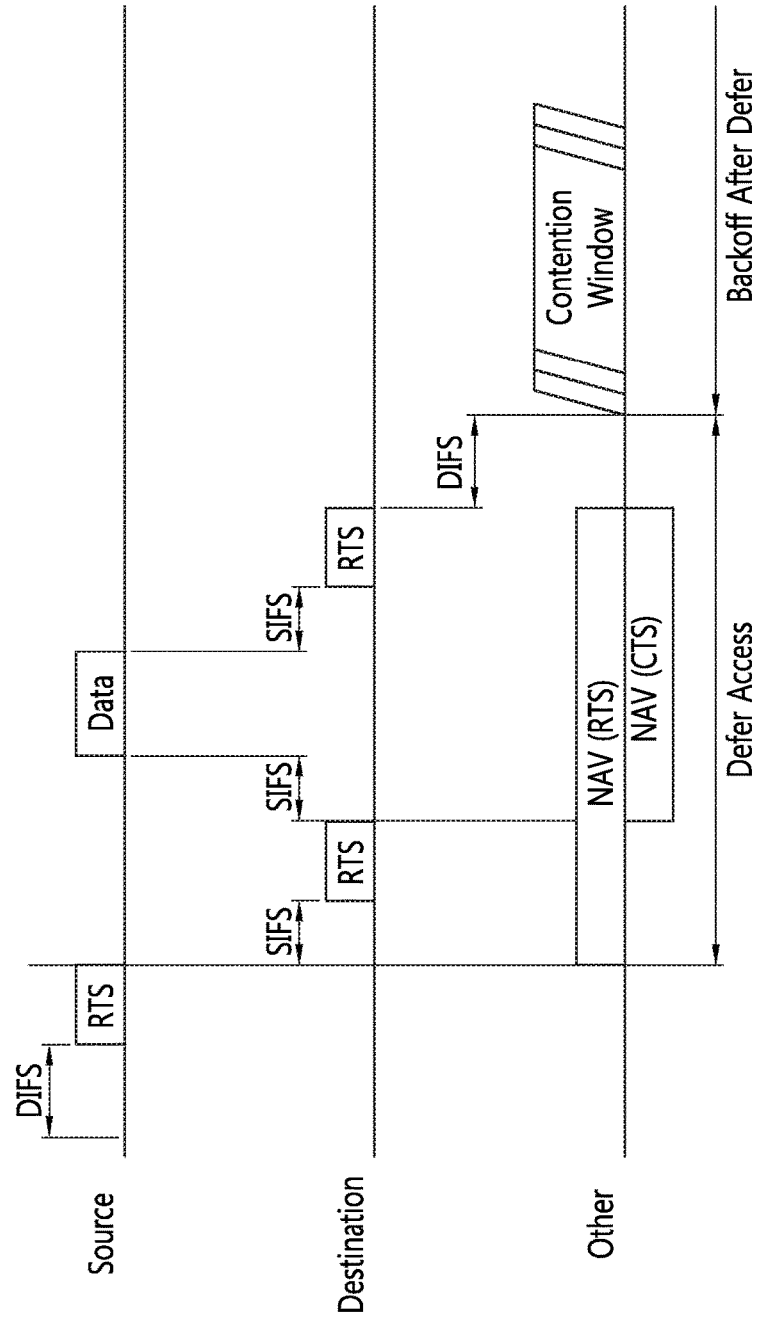

FIGS. 15-16 shows a method to occupy a medium to which the disclosed technology of the present specification may be applied Referring to FIG. 15, the most general method capable of occupying a medium, to transmit downlink data to the base station and the UE in the unlicensed band, is to allow for the base station to transmit data to transmit a RTS frame (hereinafter, RTS), and then for the UE to receive data to transmit a CTS frame (hereinafter, CTS), and then for the base station to transmit, through the unlicensed band to the UE, the LTE frame which is a data frame to be matched with a mobile communication standard.

For example, wherein the mobile communication system is a LTE (Long Term Evolution) or a LTE-A (Long Term Evolution-Advanced) system.

That is, the UE may, at a specific frame or a specific subframe, receive, through the unlicensed band from the mobile communication base station, the data channel, after transmitting the CTS frame.

Hereinafter, for the purpose of explanation, the specific frame, or the specific subframe may be used together with a term of the above mentioned data frame and the LTE frame.

In this case, as shown in FIG. 16, STAs having received the RTS, the CTS, and the data packet perform setting a Network Allocation Vector (NAV) using information of a duration field included in the RTS, the CTS, the data packet. The STA to which the NAV is set, determines that the medium will be busy for a corresponding NAV duration, and does not perform transmitting data.

As to the explanation of the disclosures of the present specification, it will be explained to assume that the base station transmits the RTS for the medium occupation, channel occupation, and channel reservation, and then the UE transmits the CTS, but the disclosures of the present specification may be applicable to other methods to occupy the channel.

For instance, the other methods to occupy the channel may include 1) a method that the base station or UE transmits only the CTS (or CTS-to-self) without the RTS transmission, 2) the method that the base station transmits the CTS (or CTS-to-self), and then the UE the CTS (or CTS-to-self), 3) the method that the base station transmits both the RTS and the CTS (or CTS-to-self), and 4) the method that the base station or the UE transmits a preamble packet configured for the PLCP preamble and the SIGNAL field (L-SIG field) etc.

Meanwhile, the WLAN system (802.11.n/ac) is defining the primary 20 MHz channel and the secondary 20 MHz channel for the operation and utilization on operation bandwidth greater than 20 MHz (e.g. 40 MHz, 80 MHz, and 160 MHz).

Channel of X MHz greater than 20 MHz is composed of X/20 number of the 20 MHz channel, and each 20 MHz channel may be defined as the primary 20 MHz channel and the secondary 20 MHz channel.

The primary 20 MHz channel is defined is defined in the AP (BSS)-specific manner, and different BSSs may have different operation bands, center frequencies, and primary 20 MHz channels, respectively.

In this case, only one primary 20 MHz channel exists, and the STA may perform a back-off only in the primary 20 MHz channel.

It performs CCA on the secondary channels, and if the medium has been free for a PIFS (Point Inter-Frame Space) when the back-off counter reaches zero, the corresponding secondary channel is considered available and may be used for transmission.

The STA will always transmit a packet, using the channel region including the primary 20 MHz channel, when transmitting the packet using bandwidth smaller than the operation bandwidth. Thus, with the perspective to a specific STA, since the packet transmitted by using only the secondary 20 MHz channel without including the primary 20 MHz channel, is not a packet transmitted to the STA itself, if the corresponding packet has been transmitted, then the STA only performs the channel sensing, but does not perform a decoding of packet.

Accordingly, if the base station or UE operated in the unlicensed band transmits the RTS/CTS on the secondary channel of the surrounding BSS, then the STAs do not set a NAV value, since it is operated in the corresponding BSS failed to detect or receive the corresponding RTS/CTS, and thus the base station/UE may not perform the medium occupation properly for the desired duration.

Accordingly, the disclosure of the present specification proposes a scheme to be considered so that the LTE system operated in the unlicensed band can be operated in the secondary channel in the WLAN.

However, it can be assumed that in the process of transmitting all signals by the base station (eNodeB) and UE, the process may be performed, in which the transmission is performed, if the carrier sensing is firstly performed, and thus the medium is idle.

As to the explanation of the disclosures of the present specification, it is explained to assume the case that the operation bandwidth of the LTE-U cell is 20 MHz, but it is apparent that the disclosures of the present specification may be applicable to the case of having a different bandwidth.

The contents related to the configuration for the medium occupation scheme, and the data reception scheme through the unlicensed band to be applied, in accordance with the disclosures of the present specification, may be transmitted on the PDCCH, EPDCCH, or the higher-layer signaling etc.

In this case, specifically, the contents related to the configuration may be transmitted on the PCell or SCell which is operated in the licensed band.

Specifically, a first disclosure of the disclosures of the present specification proposes a configuration of the operating channel for the data transmission on the unlicensed band, and the data reception method based on the configuration, while a second disclosure of the disclosures of the present specification proposes a method to acquire information on the operating channel for the surrounding BSS based on the Beacon.

I. First Disclosure of the Present Invention

The first disclosure of the present invention proposes a method of configuring the operating channel for transmitting data on the unlicensed band, and receiving data based on the configuration in a wireless communication system.

Figure 17:
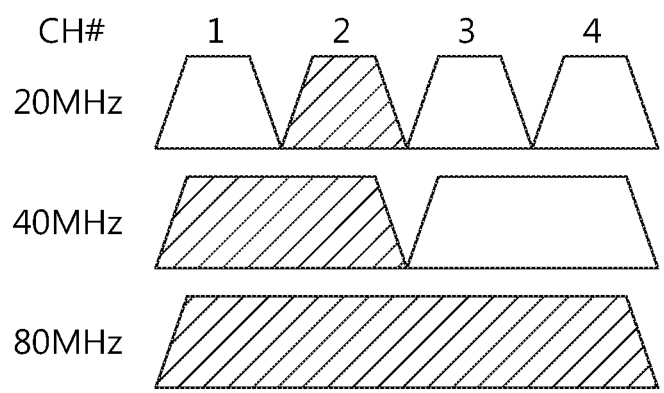
FIG. 17 is an example of the operation band in a wireless LAN.

FIG. 17 shows an example of the operation band in a wireless LAN.

Referring to FIG. 17, BSS which uses the operation band greater than 80 MHz, may use four channels of 20 MHz composed of a channel number (CH #) 1, 2, 3, 4.

In this case, when a primary channel of the corresponding BSS is CH #2, and if a packet is transmitted using 20 MHz bandwidth in the corresponding BSS, then the packet would be transmitted using CH #2, and if a packet is transmitted using 40 MHz bandwidth, then the packet would be transmitted using CH #1, #2, and if a packet is transmitted using 80 MHz bandwidth, then the packet would be transmitted using CH #1, #2, #3, #4.

In this case, if a packet is transmitted using 40 MHz bandwidth in the BSS using an operation bandwidth of 80 MHz or 160 MHz, then the used channel region of 40 MHz may be referred to as a primary 40 MHz channel, and if a packet is transmitted using 80 MHz bandwidth in the BSS using an operation bandwidth of 160 MHz, then the used channel region of 80 MHz may be referred to as a primary 80 MHz channel.

In this case, though a packet is exchanged through any bandwidth, the packet is transmitted through the bandwidth including the primary 20 MHz channel, and thus the RTS and CTS are also transmitted through the channels including the primary 20 MHz channel.

Thus, since the packet, having transmitted only using a secondary 20 MHz channel without including the primary 20 MHz channel with respect to a specific STA, is not the packet transmitted toward on its own, if the corresponding packet is transmitted, then only sensing is performed but decoding a packet is not performed.

In this environment, if the LTE-U transmits the RTS/CTS and then data only using the secondary channel, then occupation of a medium for transmitting data may not be performed properly.

In order to solve this, the first disclosure of the present specification proposes to use the secondary 20 MHz channel.

In the first disclosure of the present specification, it will be explained being assumed that the base station transmits the RTS and then the UE transmits the CTS, the first disclosure of the present specification may be applicable to other methods to occupy a channel.

For instance, this method to occupy a channel includes a method in which the base station or the UE transmits only the CTS (or CTS-to-self) without transmitting the RTS, a method in which the base station transmits the CTS (or CTS-to-self), and then the UE transmits the CTS (or CTS-to-self), a method in which the base station transmits both the RTS and the CTS, and a method in which the base station or the UE transmits a preamble configured for a PLCP preamble or a SIGNAL field (L-SIG field) etc.

1. First Method: Utilization of Only the Primary 20 MHz Channel

Figure 18:
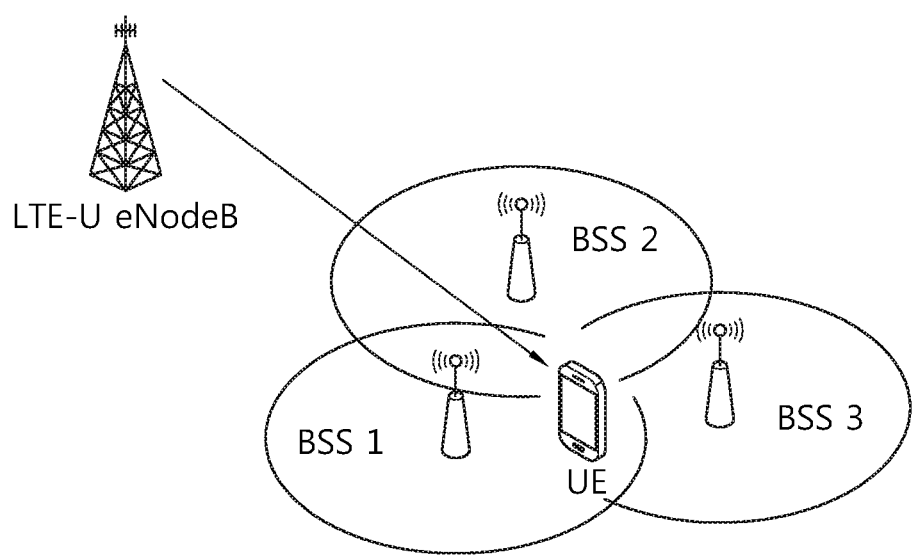
FIG. 18 is an exemplary diagram showing data transmission scheme, in accordance with a first method of the first disclosure of the present specification.

For the channel occupation in a specific channel, in the LTE-U system (a mobile communication system using both the licensed band and the unlicensed band), the first method proposes that in order to prevent the situation that since the corresponding channel is the secondary 20 MHz channel of the surrounding BSSs, the occupation of medium is not performed properly, when the RTS/CTS (CTS-to-self) has been transmitted, and then data (LTE frame) is transmitted, the LTE-system operates only in the primary 20 MHz channel used in surrounding BSSs, FIG. 18 is an exemplary diagram showing data transmission scheme, in accordance with a first method of the first disclosure of the present specification.

Referring to FIG. 18, if, in the bandwidth in which a LTE-U base station (cell) wants to use, three BSSs of BSS1, BSS2, and BSS3 exist around surrounding the base station and the UE and all of three BSSs use CH #3 as the primary 20 MHz channel, an operating channel location may be configured/changed to CH #3, which is a location of the primary 20 MHz channel that the surrounding BSS uses.

To this end, the base station may determine the channel location in which the UE is operated, and may configure/change the operating channel location of UE, by identifying by the base station on its own, or using information which the UE reports on the surrounding BSSs.

For instance, 1) if the UE reports to the base station, beacon information including the primary 20 MHz channel location information of the surrounding BSSs and a value of measurement power (for a beacon), such as a beacon scanning and report scheme, in accordance with a second disclosure of the present specification described hereinafter, then the base station may determine the operating channel location of UE using this information. Or, 2) if the UE itself reports to the base station, information on the primary 20 MHz channel in which is used by the BSS having the maximum measurement power, or is used by the largest number of BSSs, then the base station may determine the operating channel location of UE using this information.

In this case, if the base station may operate/control a plurality of channel in the unlicensed band, then the base station may configure different operating channel location based on the primary 20 MHz channel location used the surrounding BSS of each UE per UE.

However, if the base station may operate/control only one channel in the unlicensed band, then the base station may select the channel location in which the largest number of UEs may operate in the primary 20 MHz channel of the surrounding BSSs, and may control the UE to operate in the corresponding channel.

2. Second Method: RTS/CTS Transmission to the Primary 20 MHz Channel

The second method proposes as follows a method in which in order to prevent the situation the occupation of medium is not performed properly, as the corresponding channel is the secondary 20 MHz channel of the surrounding BSSs, when the LTE-U system transmits the RTS/CTS, and transmits data in a specific channel, the LTE-U system transmits the RTS, CTS (CTS-to-self), using the primary 20 MHz channel used by the surrounding BSSs.

(1) 2-1 Method: RTS/CTS Transmission with Only the Primary 20 MHz Channel

According to the 2-1 method, the LTE-U system may transmit the RTS, CTS(CTS-to-self) using the primary 20

MHz channel used by the surrounding BSSs, and may transmit the data (LTE frame) through its own operating channel.

Figure 19:
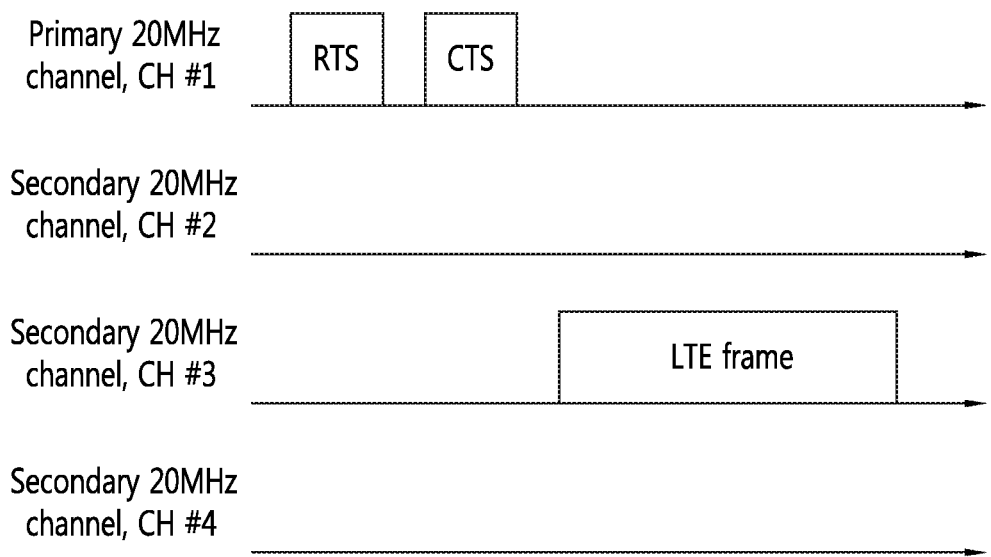
FIG. 19 is an exemplary diagram showing data transmission method, in accordance with the 2-1 method of the first disclosure of the present specification.

FIG. 19 is an exemplary diagram showing data transmission method, in accordance with the 2-1 method of the first disclosure of the present specification.

Referring to FIG. 19, in the band of the bandwidth on which the LTE-U base station (or cell), the BSS(s) may exist around the base station and/or the UE, and the corresponding BSS(s) may use CH #1 as the primary 20 MHz channel.

In this case, as shown in FIG. 19, if the LTE-U cell wants to use CH #3, the secondary channel of the surrounding BSS(s) as the operating channel, then it occupies a medium for a certain period time, by transmitting the RTS, CTS, CTS-to-self on CH #1, the primary 20 MHz channel, and may transmit data (LTE frame) on the CH #3, its operating channel.

In this case, the base station may configure, through the higher-layer signaling to the UE, the channel location to transmit the RTS/CTS. Or, whenever the base station transmits data to the UE, it may configure the channel location to transmit the RTS/CTS using an (E)PDCCH (or DL grant) etc. Or, the base station may configure, through the higher-layer signaling to the UE, a specific channel location as the primary 20 MHz channel location.

In this case, the above mentioned (E)PDCCH (or DL grant) or the higher-layer signaling may be transmitted through a PCell or SCell in the licensed band.

In this case, the UE may identify the specific channel location as the primary 20 MHz channel location which the UE itself should consider, and may perform a channel occupation with the corresponding primary 20 MHz channel. In this case, this configuration may be specifically done through the PCell operated in the licensed band (or SCell operated in the licensed band).

In other words, according to the 2-1 method, the terminal (UE) using both the licensed band and the unlicensed band for communicating with a mobile communication base station, may transmit a CTS frame defined by the WLAN system on a first channel bandwidth included in the unlicensed band, before receiving the data channel from the mobile communication base station, and may receive, at a specific frame or a specific subframe, the data channel on a second channel bandwidth included in the unlicensed band from the mobile communication base station, after transmitting the CTS frame.

The mobile communication base station may transmit a RTS frame defined by the WLAN system through the first channel bandwidth, before transmitting the data channel to the terminal.

Herein, the specific frame or the specific subframe in which the data channel is received, is a frame or a subframe used in a mobile communication system operated on the licensed band.

The first channel bandwidth is a first primary channel bandwidth which should be necessarily included therein, when the at least one BSS positioned at least one surrounding region of the mobile communication base station and the terminal transmits and receives data, and the second channel bandwidth is a second primary channel bandwidth which should be necessarily used when transmitting and receiving data between the mobile communication base station and the terminal.

The second primary channel may be a secondary channel for the at least one BSS.

Especially, the unlicensed band has a bandwidth equivalent to any one of 40 MHz, 80 MHz, and 160 MHz, and the first or second primary channel has a bandwidth of 20 MHz.

Further, the terminal may acquire information on an operating channel of at least one BSS from a beacon signal periodically transmitted by at least one AP (Access Point) included in a WLAN system, and may report it to the base station.

In this case, the mobile communication base station may acquire the information on the first channel bandwidth based on the information on the operating channel of the at least one BSS, may report it to the terminal.

In this case, the information on the first channel bandwidth is transmitted via a PDCCH (Physical Downlink Control Channel), EPDCCH (Enhanced Physical Downlink Control Channel) or the higher-layer signaling.

Further, the PDCCH, EPDCCH, and the higher-layer signaling may be transmitted through the PCell and the SCell operated in the licensed band.

(2) 2-2 Method: RTS/CTS Transmission to the Primary 20 MHz and Secondary Channel According to the 2-2 method, the LTE-U system may transmit the RTS, CTS (CTS-to-self) using the primary 20 MHz channel used by the surrounding BSS and the operating channel (20 MHz) used by the LTE-U, and if it successfully transmits the RTS, CTS (CTS-to-self) on both channels, then it may transmit the data (LTE frame) on its operating channel.

Figure 20:
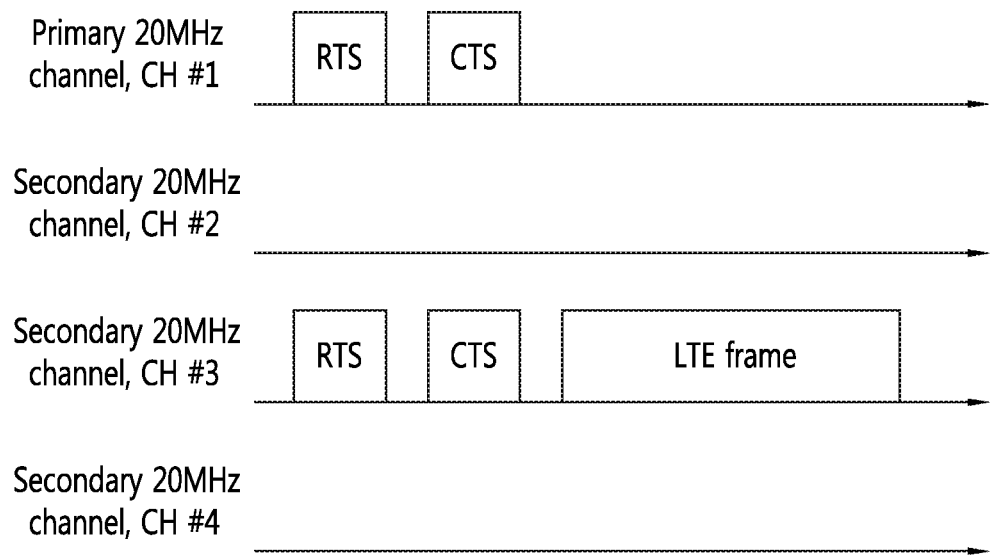
FIG. 20 is an exemplary diagram showing data transmission scheme, in accordance with the 2-2 method of the first disclosure of the present specification.

FIG. 20 is an exemplary diagram showing data transmission scheme, in accordance with the 2-2 method of the first disclosure of the present specification.

Referring to FIG. 20, in the band of the bandwidth in which the LTE-U cell wants to use, the BSS(s) exists around the base station and/or the UE, and the corresponding BSS(s) may use CH #1 as the primary 20 MHz channel.

In this case, as shown in FIG. 20, if the LTE-U cell wants to use CH #3, the secondary channel of the surrounding BSS(s) as the operating channel, then it occupies a medium for a certain period time, by transmitting the RTS, CTS, CTS-to-self on CH #1, the primary 20 MHz channel and CH #3, its operating channel, and may transmit data (LTE frame) on the CH #3, its operating channel.

In this case, if a transmission of the RTS, CTS (CTS-to-self) is not properly performed on at least one of the primary 20 MHz channel and its operation bandwidth, due to a busy channel or collision, then the LTE-U cell may not transmit the data (LTE frame) as it does not occupy the channel. If the primary 20 MHz channel location is the same as the operating channel location, then the RTS, CTS, and CTS-to-self may be transmitted only on the primary 20 MHz channel.

In this case, the base station may configure, through the higher-layer signaling to the UE, an additional channel location to transmit the RTS/CTS in addition to its operating channel. Or, whenever the base station transmits data to the UE, it may configure the channel location to additionally transmit the RTS/CTS using the (E)PDCCH (or DL grant) etc.

Further, the base station may configure, through the higher-layer signaling to the UE, a plurality of (two) channel locations to transmit the RTS/CTS.

Further, whenever the base station transmit data to the UE, it may configure a plurality of (two) channel locations to transmit the RTS/CTS using the (E)PDCCH (or DL grant) etc.

In this case, the above mentioned (E)PDCCH (or DL grant) may be transmitted through the PCell or SCell operated in the licensed band.

Further, the base station may configure, through the higher-layer signaling to the UE, a specific channel location as the primary 20 MHz channel location. In this case, the UE may identify the specific channel location as the primary 20 MHz channel location which it should consider, and may perform a channel occupation with its operating channel and the corresponding primary 20 MHz channel. In this case, this configuration may be specifically done through the PCell operated in the licensed band (SCell operated in the licensed band).

(2) 2-3 Method: RTS/CTS Transmission with 40 MHz Channel or 80 MHz Channel being the Primary 20 MHz Channel Included According to the 2-3 method, the LTE-U system may transmit RTS, CTS, CTS (CTS-to-self), through the channel with the smallest bandwidth of the channel to which the operating channel of the LTE-U cell belongs, among the primary 20 MHz channel used by the surrounding BSS, 40 MHz channel being the primary 20 MHz channel included (e.g. the primary 40 MHz channel), and 80 MHz channel being the primary 20 MHz channel included (e.g. the primary 80 MHz channel), and if the RTS, CTS, CTS (CTS-to-self) is successfully transmitted, then the data (LTE frame) may be transmitted with its own operating channel.

Figure 21:
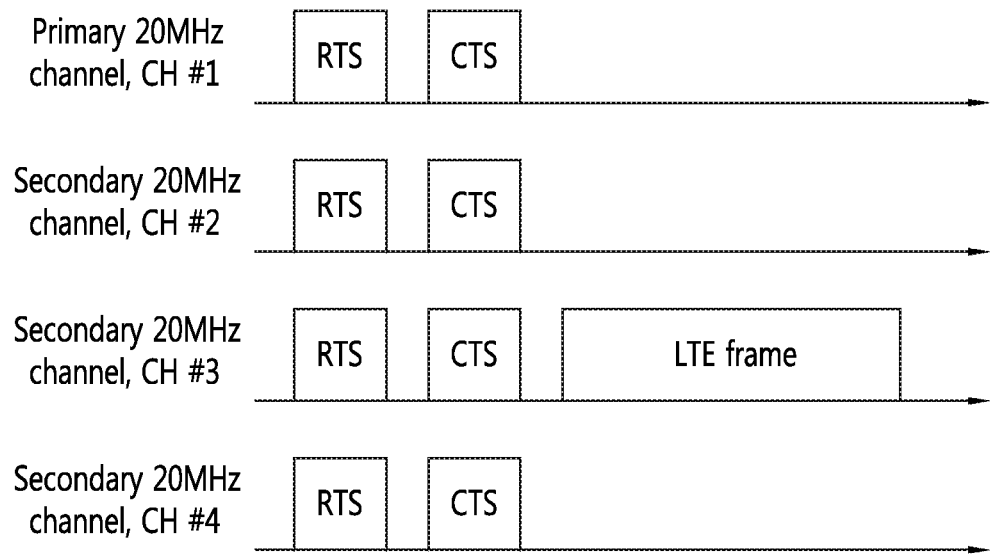
FIG. 21 is an exemplary diagram showing data transmission scheme, in accordance with the 2-3 method of the first disclosure of the present specification.

FIG. 21 is an exemplary diagram showing data transmission scheme, in accordance with the 2-3 method of the first disclosure of the present specification.

Referring to FIG. 21, in the band of the bandwidth in which the LTE-U cell wants to use, the BSS(s) exists around the base station and/or the UE, and the corresponding BSS(s) may use CH #1 as the primary 20 MHz channel.

In this case, the 40 MHz channel being the primary 20 MHz channel of the corresponding BSS(s) included (e.g. the primary 40 MHz channel) may become CH #1 and CH #2, and the 80 MHz channel being the primary 20 MHz channel of the corresponding BSS(s) included (e.g. the primary 80 MHz channel) may be equal to CH #1, CH #2, CH #3 and CH #4.

In this case, if the operating channel of the LTE-U cell is equal to CH #1, then the corresponding operating channel is included in the primary 20 MHz channel, and thus the base station may occupy a medium for a certain period time, by transmitting the RTS, CTS, CTS-to-self on the primary 20 MHz channel (CH #1), and may transmit data (LTE frame) on the CH #1, its operating channel.

If the operating channel of the LTE-U cell is equal to CH #2, then the corresponding operating channel is not included in the primary 20 MHz channel, but included in P-40 MHz, and thus, the base station may occupy a medium for a certain period time, by transmitting the RTS, CTS, CTS-to-self on the P-40 MHz (e.g. CH #1 and CH #2), and may transmit data (LTE frame) on the CH #2, its operating channel.

Further, if the operating channel of the LTE-U cell is equal to CH #3 or CH #4, then the corresponding operating channel is not included in the primary 20 MHz channel and the P-40 MHz, but included in P-80 MHz, and thus, the base station may occupy a medium for a certain period time, by transmitting the RTS, CTS, CTS-to-self on the P-80 MHz (e.g. CH #1, #2, #3 and #4), and may transmit data (LTE frame) on its operating channel.

In this case, the base station may configure, through the higher-layer signaling to the UE, a plurality of channel locations to transmit the RTS/CTS in addition to its operating channel.

Further, whenever the base station transmits data to the UE, it may configure the plurality of channel locations to additionally transmit the RTS/CTS using the (E)PDCCH (or DL grant) etc.

Further, the base station may configure, through the higher-layer signaling to the UE, the plurality of channel locations to transmit the RTS/CTS.

Further, whenever the base station transmits data to the UE, it may configure the plurality of channel locations to transmit the RTS/CTS using the (E)PDCCH (or DL grant) etc.

In this case, the above mentioned (E)PDCCH (or DL grant) may be transmitted through the PCell or SCell operated in the licensed band.

Further, the base station may configure, through the higher-layer signaling to the UE, a specific channel location as the primary 20 MHz channel location. In this case, the UE may identify it the primary 20 MHz channel location which it should consider, and may perform the occupation of channel through the primary 40 MHz channel location and the primary 80 MHz channel location based on channelization information. In this case, this configuration may be done through the PCell operated in the licensed band (SCell operated in the licensed band).

(4) 2-4 Method: RTS/CTS Transmission with 80 MHz Channel being the Primary 20 MHz Channel Included If the primary 20 MHz channel locations used by the surrounding BSSs of the LTE-U cell are different from each other, occurred may be the problem that the primary 20 MHz channel locations to be considered to occupy a medium by the LTE-U cell are multiple locations.

Considering this case, the 2-4 method proposes that the RTS, CTS (CTS-to-self) is transmitted through the 80 MHz channel being the operating channel of the LTE-U cell included, and if the RTS, CTS (CTS-to-self) has been successfully transmitted in all channel regions, then the data (LTE frame) is transmitted on its operating channel.

Figure 22:
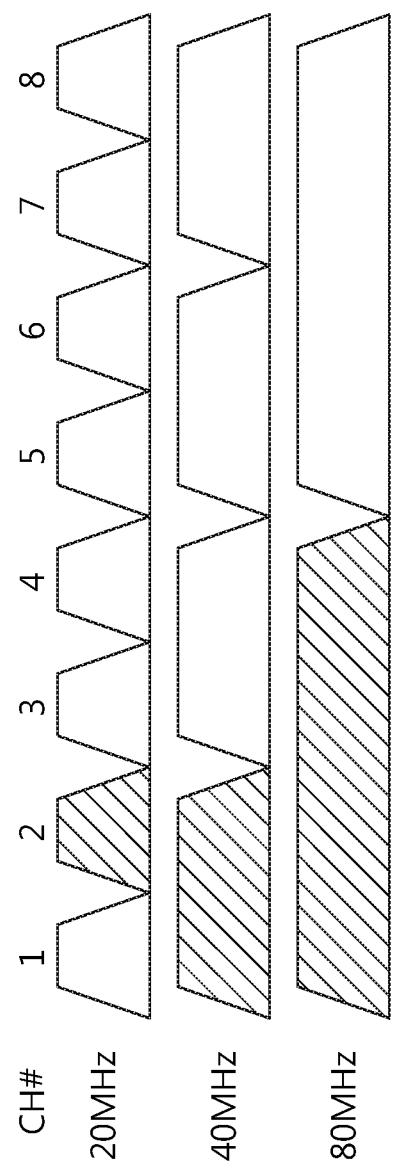
FIG. 22 is exemplary diagram showing data transmission scheme, in accordance with the 2-4 method of the first disclosure of the present specification.

FIG. 22 is exemplary diagram showing data transmission scheme, in accordance with the 2-4 method of the first disclosure of the present specification.

Referring to FIG. 22, the 80 MHz channel region being the operation band of the LTE-U cell included is become a region corresponding to CH #1, #2, #3, and #4 being the CH #2 included, which the operation band of the LTE-U cell is the CH #2, when a channelization of the WLAN system has been done.

For instance, if the operation band used by the LTE-U cell is equal to the CH #2, and the 80 MHz channel region being the CH #2 included (e.g. primary 80 MHz channel) is the region corresponding to the CH #1, #2, #3, and #4, then the base station may occupy a medium for a certain period time, by transmitting the RTS, CTS, CTS-to-self on the primary 80 MHz channel, and may transmit data (LTE frame) on its operating channel.

In this case, the base station may configure, through the higher-layer signaling to the UE, a plurality of channel locations to transmit the RTS/CTS in addition to its operating channel.

Further, whenever the base station transmits data to the UE, it may configure the plurality of channel locations to additionally transmit the RTS/CTS using the (E)PDCCH (or DL grant) etc.

Further, the base station may configure, through the higher-layer signaling to the UE, the plurality of channel locations to transmit the RTS/CTS. Further, whenever the base station transmits data to the UE, it may configure the plurality of channel locations to transmit the RTS/CTS using the (E)PDCCH (or DL grant) etc.

In this case, the above mentioned (E)PDCCH (or DL grant) may be transmitted through the PCell or SCell operated in the licensed band.

Further, the UE may determine the primary 80 MHz channel location based on its operating channel location and channelization information, without configuring the channel location to transmit the RTS/CTS, and may perform the occupation of channel using the determined channel location. In this case, this configuration may be done through the PCell operated in the licensed band (SCell operated in the licensed band).

3. Third Method: Use the Secondary Channel Along with the Primary 20 MHz Channel The third method proposes to use the secondary 20 MHz channel along with the primary 20 MHz channel, in order for a specific cell to use the secondary 20 MHz channel as the operating channel in the LTE-U system.

For instance, according to the third method, CA (carrier aggregation) may be always applied with the cell (e.g. cell A) which uses the primary 20 MHz channel as the operating channel, in order for the specific cell (e.g. cell B) to use the secondary 20 MHz channel as the operating channel in the LTE-U system.

In this case, specifically if the cell A uses the CH#1, the primary 20 MHz channel, and the cell B uses the CH#2, the secondary channel, then a medium should be occupied for all of two channels, by transmitting the RTS, CTS, CTS-to-self through the CH#1 and CH#2, in order to transmit data on the Cell B. And then, the base station may transmit through the Cell A and the Cell B to the UE(s), the data (LTE frame). However, if the Cell A wants to transmit the data only with the Cell A operated with the primary 20 MHz channel, then it may occupy a medium by transmitting the RTS, CTS, CTS-to-self only through the CH#1 on which the Cell A operates, and may transmit the data.

Further, for example, according to the method 3, though the Cell A operated on the specific primary 20 MHz channel and the Cell B operated on the secondary 20 MHz channel are not associated with CA, a medium may be occupied to all of two channels for a certain period of time, in order for the Cell B to transmit data, by transmitting the RTS, CTS, CTS-to-self from the base station to operate/control the Cell A and the base station to operate/control the Cell B. And then, the base station may transmit, through the Cell A and/or Cell B to the UE(s), the data (LTE frame).

II. A Second Disclosure of the Present Specification

The second disclosure of the present specification proposes a method to acquire information on the operating channel for the surrounding BSS based on a beacon scanning.

One of the method in which the UE/base station may aware the primary 20 MHz channel location of the WLAN system is to identify the information on the primary 20 MHz channel location included in the corresponding beacon, by receiving, at the UE, a packet such as a beacon periodically transmitted from the WLAN system.

Though the packet in the WLAN system, unlike the LTE system, has not been transmitted toward on its own, al l STAs may decode data in the corresponding packet and may analyze (to some extent). Thus, if the UE has ability to receive the WLAN packet, then the UEs may also receive/analyze the beacon transmitted from the AP.

According to the second disclosure of the present specification, the UE may acquire information on the operating channel of the surrounding STAs using the corresponding channel, by scanning, by the UE, the beacons in the operating channel of the LTE-U cell by which the UE itself is served.

The UE may report to the base station, the information acquired from scanning the beacon in this way. Further, this report specifically may be done through the PCell (operated through the licensed band).

The UE may report to the base station, all of the information acquired in this way. Further, the UE may report to the base station, only some of the information included in the beacon, and the information reported from the UE to the base station may specifically include following information.

a) operating channel bandwidth
b) center frequency location (if an operating frequency is non-contiguous 160 MHz, then two center frequencies may be transmitted for each 80 MHz)
c) the primary 20 MHz channel location (channel number) (the secondary channel location)
d) BSS ID (Identification)

If the UE has scanned the beacon for a plurality of BSSs, then this information may be reported in a plurality of 'information set included in the beacon' to per BSS Further, if the beacon scanned by the UE is a multiple, the UE may perform reporting only information on the beacon (or BSS) with its maximum measurement power, or information on M beacons (or BSSs) in the order of measurement power, among information on a plurality of beacons.

This measurement power for each BSS (or beacon of the BSS) may be additionally measured by the UE, but a value of RCPI (Received channel power identification) acquired from a WLAN module.

The RCPI is equal to 'an indication of the total channel power (signal, noise, and interference) of a received frame measured on the channel and the antenna connector used to receive the frame,' and the RCPI is defined in 802.11 standards.

Specifically, if the UE reports to the base station, 'information set included in the beacon,' then it may be reported to include a value of the measurement power (of the beacon) for the corresponding BSS (e.g. RCPI).

Thus, if the UE reports to the base station 'information set included in the beacon,' by scanning the beacon for a plurality of BSS, then it may be reported to include a value of the measurement power (e.g. RCPI) of (the beacon) for the plurality of BSS.

A timing of scanning, by the UE, information included in the beacon is as follows.

A process in which the UE scans the beacon may be performed when the UE is initially connected to the LTE-U cell.

A process in which the UE scans the beacon may be performed when the LTE-U cell is being activated.

A process in which the UE scans the beacon may be performed when the base station requests through the higher-layer signaling to the UE.

A process in which the UE scans the beacon may be periodically performed based on the periodicity requested by the base station through the higher-layer signaling to the UE.

Meanwhile, after the UE has scanned the information included in the beacon, a timing to report to the base station is as follows.

A process in which the UE reports the information included in the beacon may be performed when the UE is initially connected to the LTE-U cell.

A process in which the UE reports the information included in the beacon may be performed when the LTE-U cell is being activated.

A process in which the UE reports the information included in the beacon may be performed when the base station requests through the higher-layer signaling to the UE.

A process in which the UE reports the information included in the beacon may be periodically performed based on the periodicity requested by the base station through the higher-layer signaling to the UE.

The UE may report to the base station, if there are only changed (new) contents, by comparing information to be reported to the base station among the information included in the beacon with information having been reported at the previous timing.

In other words, according to the second disclosure of the present specification, the terminal (UE) using both the licensed band and the unlicensed band for communicating with a mobile communication base station, may transmit a CTS frame defined by the WLAN system on a first channel bandwidth included in the unlicensed band, before receiving the data channel from the mobile communication base station, and may receive, at a specific frame or a specific subframe, the data channel on a second channel bandwidth included in the unlicensed band from the mobile communication base station, after transmitting the CTS frame.

The mobile communication base station may transmit a RTS frame defined by the WLAN system through the first channel bandwidth, before transmitting the data channel to the terminal.

Herein, the specific frame or the specific subframe in which the data channel is received, is a frame or a subframe (e.g. the above mentioned data frame and LTE frame) used in a mobile communication system operated on the licensed band.

The first channel bandwidth is a first primary channel bandwidth which should be necessarily included therein, when the at least one BSS positioned at least one surrounding region of the mobile communication base station and the terminal transmits and receives data, and the second channel bandwidth is a second primary channel bandwidth which should be necessarily used when transmitting and receiving data between the mobile communication base station and the terminal.

Herein, the second primary channel may be a secondary channel for the at least one BSS.

Herein, the unlicensed band has a bandwidth equivalent to any one of 40 MHz, 80 MHz, and 160 MHz, and the first and second primary channel has a bandwidth of 20 MHz.

Further, the UE may acquire information on the operating channel of the BSS from the Beacon signal periodically transmitted by at least one AP (Access Point) included in the WLAN system.

Further, the UE may report to the mobile communication base station, the information on the operating channel for the at least one BSS.

Herein, the information on the operating channel for the at least one BSS may include information related to at least one of an operation bandwidth in which at least one channel is included, being used when the at least one BSS transmits and receives data, the center frequency location on the at least one channel, the primary channel location on the at least one BSS, and an Identification (ID) on the at least one BSS.

In this case, the mobile communication base station may acquire the information on the first channel bandwidth based on the information on the operation information for the at least one BSS, and may transmit it through the PDCCH, EPCCH, or higher-layer signaling to the UE.

In this case, the above mentioned PDCCH, EPCCH, or higher-layer signaling etc., may be transmitted through the PCell or SCell operated on the licensed band.

<Additional Disclosure of the Present Specification>

Hereinafter, the additional disclosure of the present specification will be discussed.

Specifically, in the additional disclosure of the present specification, a method to use the secondary channel will be discussed when the scheme to occupy the channel is not used.

In the above mentioned disclosures of the present specification, though a scheme is assumed to transmit the data (LTE frame), after the channel has occupied through the WLAN signal such as the RTS, CTS etc., the LTE-U system may be operated in transmitting the data (LTE frame), if the channel is idle only by CA (carrier sensing) without occupying the channel through the WLAN channel.

However, a hidden node problem may be occurred for the case of the method, in which the channel has not been occupied.

Figure 23:
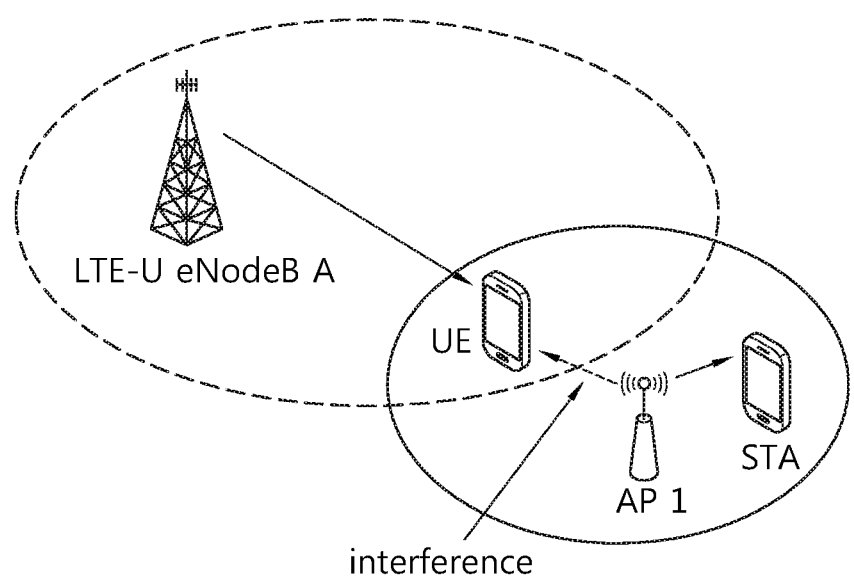
FIG. 23 is an exemplary diagram showing the hidden node problem.

FIG. 23 is an exemplary diagram showing the hidden node problem.

Referring to FIG. 23, for the case of the method, in which the channel has not been occupied, there is a problem that the signal transmitted from the AP may function as an interference to the UE, by also transmitting the WLAN signal from an AP1 to the STA, while the base station (LTE-U eNodeB A) transmits data to the UE, due to the hidden node problem between the LTE-U base station and the WLAN AP/STA.

If the LTE-U cell uses the secondary (20 MHz) channel of the surrounding WLAN BSSs as the operating channel, the additional disclosure of the present specification proposes to prevent the STAs surrounding the UE from transmitting a signal through the operating channel of UE, by transmitting 'dummy signal' from the corresponding UE or other UE(s) surrounding the UE through the primary 20 MHz channel of the WLAN BSS(s), while the UE receives the data through the operating channel.

With respect to prevent a signal transmitted from an adjacent channel from functioning as an interference signal to the UE, while the UE is receiving data, the dummy signal may be transmitted not only through the primary 20 MHz channel but also through the primary 20 MHz channel and/or adjacent channels (e.g. two channels on both sides of the operating channel) of the operating channel of UE.

Figure 24:
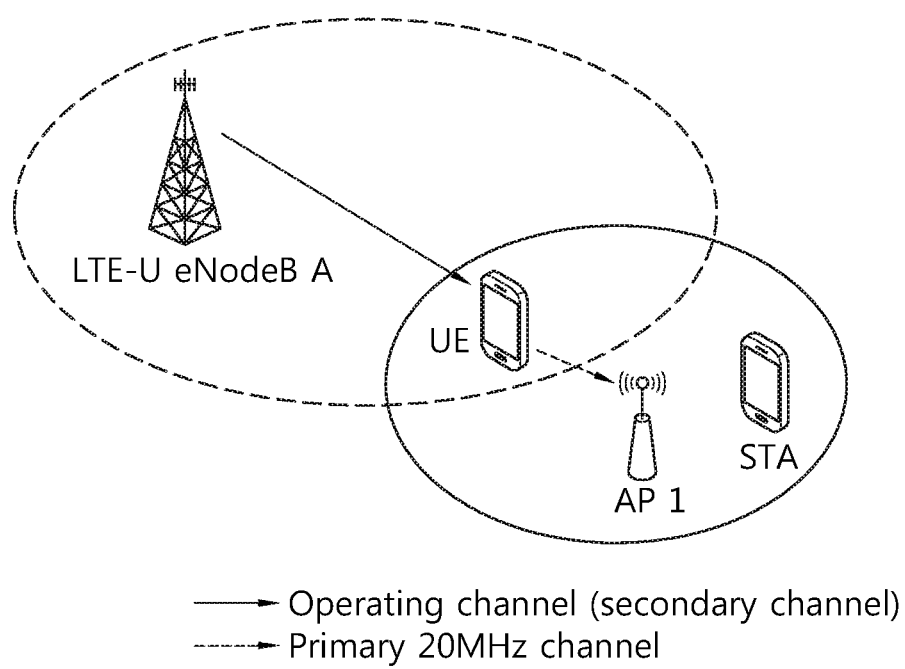
FIG. 24 is an exemplary diagram showing a scheme of the additional disclosure of the present specification.

FIG. 24 is an exemplary diagram showing a scheme of the additional disclosure of the present specification.

Referring to FIG. 24, a scheme of the additional disclosure of the present specification is the scheme, in which while the LTE-U base station transmits the data through the operating channel to the UE, the UE transmits the dummy signal through the primary 20 MHz channel of the surrounding BSSs and/or adjacent channel(s), and thus prevents the surrounding STAs from transmitting a signal.

In this case, the base station may configure, through the higher-layer signaling, the channel location(s) on which the UE transmits the dummy signal, while the base station transmits a signal to the UE.

Further, if the base station may configure, through the higher-layer signaling, the primary 20 MHz channel location(s) which the UE considers, then the UE may transmit the dummy signal through the corresponding primary 20 MHz channel(s).

Further, whenever the base station transmits data (schedules), it may inform the UE, through the DL grant or UL grant, of information on the channel location at which the dummy signal is being transmitted.

If the information on the channel location at which the dummy signal is being transmitted, is being informed through the UL grant, then specifically the UE may transmit the dummy signal through subframe #n+4, when the UL grant has received through subframe #n, in order for the UE to maintain the current UL grant transmission timing and a timing for performing on the UL.

Further, in order to reduce a timing gap between the UL grant reception and the dummy signal transmission, the UE may transmit the dummy signal through the subframe which receives the UL grant (or the next subframe).

The UE may transmit the dummy signal during the timing duration during which the base station transmits data to the UE itself.

Further, whenever the base station configures, through the higher-layer signaling to the UE, timing information (e.g. transmission start timing, transmission finish timing, and/or transmission duration) with which the UE transmits the dummy signal, or transmit (schedule) the data, the base station may informs the UE, through the DL grant or the UL grant of it.

In addition, when the UE transmits the dummy signal, the base station may configure a frequency region on which the dummy signal is transmitted, and a transmission power of the dummy signal. In this case, the base station may have the UE be configured through the higher-layer signaling, or may configure it whenever the base station transmits a signal through the UL grant to the UE.

Figure 25:
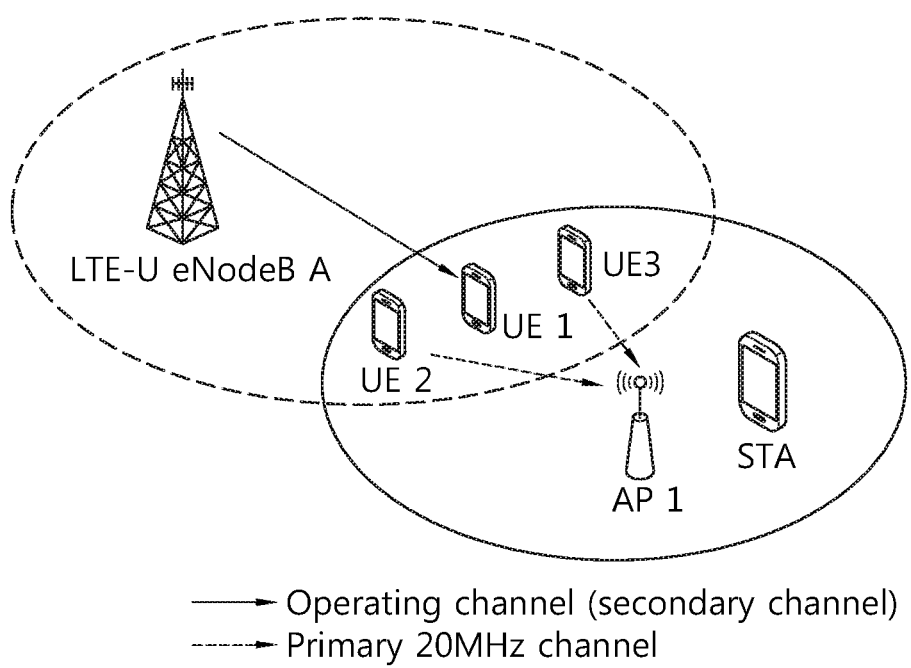
FIG. 25 is an exemplary diagram showing another scheme of an additional disclosure of the present specification.

FIG. 25 is an exemplary diagram showing another scheme of an additional disclosure of the present specification.

Referring to FIG. 25, another scheme of the additional disclosure of the present specification, is a scheme, in which while the LTE-U base station transmits the data through the operating channel to the UE, the UEs or other UE surrounding the UE transmits through the primary 20 MHz channel of the surrounding BSSs and/or adjacent channel(s) of the operating channel for the UE by which the data is being received, and thus prevents the surrounding STAs from transmitting a signal.

In this case, whenever the base station transmits (schedules) data to the UE, it may request other UE surrounding the UE by which the data is being received to transmit the dummy signal through the UL grant.

In this case, the UL grant requesting to transmit the dummy signal may be transmitted, by scrambling with a C-RNTI of the UE to transmit the dummy signal, and a plurality of UL grants scrambled with the C-RNTI of each UE may be transmitted when a plurality of UEs transmit the dummy signal. In this case, the following information may be included in the UL grant.

channel locations in which the dummy signal is transmitted information on the timing duration during which the dummy signal is transmitted (e.g. transmission start timing, transmission finish timing, and/or transmission duration)

frequency resource region on which the dummy signal is transmitted transmission power of the dummy signal In this case, the dummy signal transmitted by the UE may be a known signal to the base station, or a randomly generated signal by the UE.

If the dummy signal transmitted by the UE is the known signal to the base station, then the dummy signal, for instance, has a following form.

a form that SRS (Sounding Reference Signal) with the length of one OFDM symbol is transmitted to be repeated for a transmission duration of the dummy signal a form that (UL) DMRS (Demodulation Reference Signal) with the length of one OFDM symbol is transmitted to be repeated for a transmission duration of the dummy signal In this case, specifically the dummy signal to be transmitted by the UE has a form that both edge portion of frequency region is left being empty without transmitting a signal at least by a guard frequency region, in order to prevent it from generating interference to an adjacent channel.

In this case, the guard frequency region has a length by the number of RBs. For instance, the guard frequency region of each edge portion is configured for two RBs, the dummy signal may be transmitted through the frequency region excluding total number of four RBs by two RBs for each of both frequency regions.

Specifically, since CS (Carrier Sensing) of the STAs in the unlicensed band is done in time domain, it may be preferable that the dummy signal is narrow as possible in the frequency region, in order to prevent the dummy signal from giving an interference to an adjacent channel.

As mentioned above, embodiments of the present invention may be implemented using various means. For instance, embodiments of the present invention may be implemented using hardware, firmware, software and/or any combinations thereof and so on. Details thereof will be described with reference to the drawing.

Figure 26:
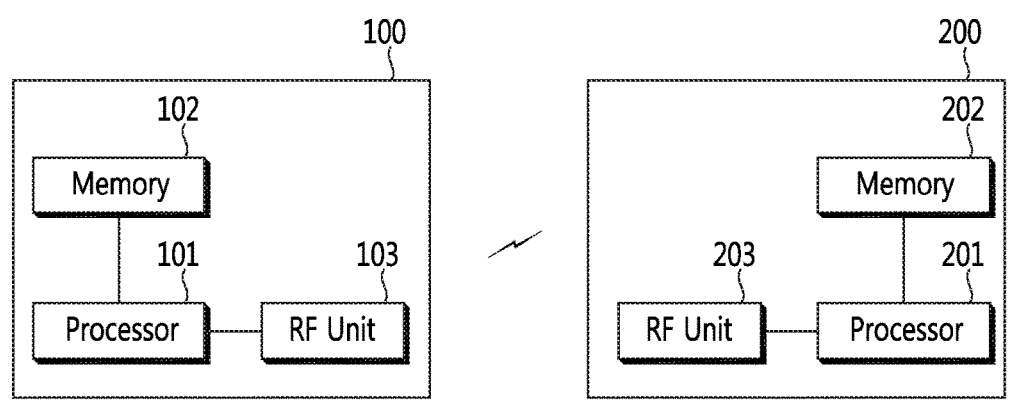
FIG. 26 is a block diagram of a wireless communication system in which the disclosure of the present specification is implemented.

FIG. 26 is a block diagram of a wireless communication system in which the disclosure of the present specification is implemented.

A base station 200 may include a processor 201, a memory 202 and a radio frequency (RF) unit 203. The memory 202 is operatively coupled with the processor 201 and stores a variety of information to operate the processor 201. The RF unit 203 is operatively coupled with the processor 201, and transmits and/or receives a radio signal. The processor 201 implements proposed functions, procedures and/or methods. In the above-mentioned embodiment, the operation of the base station may be implemented by the processor 201.

A UE 100 may include a processor 101, a memory 102 and a radio frequency (RF) unit 103. The memory 102 is operatively coupled with the processor 101 and stores a variety of information to operate the processor 101. The RF unit 103 is operatively coupled with the processor 101, and transmits and/or receives a radio signal. The processor 201 implements proposed functions, procedures and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving data, the method performed by a user equipment (UE) using both a licensed band and unlicensed band for communicating with a mobile communication base station (BS) and comprising:
    acquiring first information from a beacon signal periodically transmitted by at least one access point (AP) included in a wireless local area network (WLAN) system, the first information related to an operating channel of at least one Basic Service Set (BSS) positioned on a neighboring area of the UE;
    reporting the acquired first information to the BS;
    receiving second information from the BS, the second information acquired by the BS based on the reported first information and related to a primary channel included in the unlicensed band;
    transmitting a clear to send (CTS) frame defined in the WLAN system within the primary channel; and
    receiving the data from the BS at a specific frame or a specific subframe within a secondary channel included in the unlicensed band after transmitting the CTS frame,
    wherein the primary channel for transmitting the CTS frame is different from the secondary channel for receiving the data,
    wherein the specific frame or the specific subframe is used in a mobile communication system operated on the licensed band,
    wherein, while the UE receives the data through the secondary channel included in the unlicensed band, a dummy signal is transmitted from other UEs surrounding the UE through the primary channel and two neighboring channels on both sides of the primary channel,
    wherein the dummy signal is transmitted through an uplink (UL) grant that is scrambled with a cell identifier of the UE, and
    wherein the UL grant includes at least one of information related to a channel location in which the dummy signal is transmitted, information related to a time duration during which the dummy signal is transmitted, information related to a frequency resource region on which the dummy signal is transmitted, or information related to a transmission power of the dummy signal.

2. The method of claim 1, wherein:
    the unlicensed Band has a bandwidth corresponding to 40 MHz, 80 MHz or 160 MHz; and
    the primary channel has a bandwidth of 20 MHz and is used by the at least one BSS or when transmitting and receiving data between the BS and the UE.

3. The method of claim 1, further comprising receiving a request to send (RTS) frame defined in the WLAN system from the BS on the primary channel before receiving the data.

4. The method of claim 1, wherein the first information includes information related to at least an operation bandwidth in which at least one channel is included, information used when the at least one BSS transmits and receives data, information related to a location of a center frequency on the at least one channel, information related to a location of the primary channel on the at least one BSS or an Identification of the at least one BSS.

5. The method of claim 1, wherein the second information is received via a physical downlink control channel, an enhanced physical downlink control channel or higher layer signaling.

6. A user equipment (UE) using both a licensed band and unlicensed band for communicating with a mobile communication base station (BS), the UE comprising:
    a transceiver configured to transmit and receive signals; and
    a processor connected to the transceiver and configured to:
    control the transceiver to acquire first information from a beacon signal periodically transmitted by at least one access point (AP) included in a wireless local area network (WLAN) system, the first information related to an operating channel of at least one Basic Service Set (BSS) positioned on a neighboring area of the UE;
    control the transceiver to report the acquired first information to the BS;
    control the transceiver to receive second information from the BS, the second information acquired by the BS based on the reported first information and related to a primary channel included in the unlicensed band;
    control the transceiver to transmit a clear to send (CTS) frame defined in the WLAN system within the primary channel; and
    control the transceiver to receive data from the BS at a specific frame or a specific subframe within a secondary channel included in the unlicensed band after transmitting the CTS frame,
    wherein the primary channel for transmitting the CTS frame is different from the secondary channel for receiving the data,
    wherein the specific frame or the specific subframe is used in a mobile communication system operated on the licensed band,
    wherein, while the UE receives the data through the secondary channel included in the unlicensed band, a dummy signal is transmitted from other UEs surrounding the UE through the primary channel and two neighboring channels on both sides of the primary channel,
    wherein the dummy signal is transmitted through an uplink (UL) grant that is scrambled with a cell identifier of the UE, and
    wherein the UL grant includes at least one of information related to a channel location in which the dummy signal is transmitted, information related to a time duration during which the dummy signal is transmitted, information related to a frequency resource region on which the dummy signal is transmitted, or information related to a transmission power of the dummy signal.

7. The UE of claim 6, wherein:
    the unlicensed Band has a bandwidth corresponding to 40 MHz, 80 MHz or 160 MHz; and
    the primary channel has a bandwidth of 20 MHz and is used by the at least one BSS or when transmitting and receiving data between the BS and the UE.

8. The UE of claim 6, wherein the processor is further configured to control the transceiver to receive a request to send (RTS) frame defined in the WLAN system from the BS on the primary channel before receiving the data channel.

9. The UE of claim 6, wherein the first information includes information related to at least an operation bandwidth in which at least one channel is included, information used when the at least one BSS transmits and receives data, information related to a location of a center frequency on the at least one channel, information related to a location of the primary channel on the at least one BSS or an Identification of the at least one BSS.

10. The UE of claim 6, wherein the second information is received via a physical downlink control channel, an enhanced physical downlink control channel or higher layer signaling.

* * * * *